US009490985B2

(12) United States Patent
Carlson et al.

(10) Patent No.: US 9,490,985 B2
(45) Date of Patent: Nov. 8, 2016

(54) SYSTEMS AND METHODS TO SECURE USER IDENTIFICATION

(71) Applicant: Visa International Service Association, San Francisco, CA (US)

(72) Inventors: Mark Carlson, Half Moon Bay, CA (US); Michael Steven Bankston, Pacifica, CA (US); Kalpana Jogi, San Francisco, CA (US); Timothy Gallagher, Highlands Ranch, CO (US); Alesia Panagiotides, San Mateo, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 21 days.

(21) Appl. No.: 14/459,749

(22) Filed: Aug. 14, 2014

(65) Prior Publication Data

US 2014/0359298 A1    Dec. 4, 2014

Related U.S. Application Data

(63) Continuation of application No. 13/623,784, filed on Sep. 20, 2012, now Pat. No. 8,838,982.

(60) Provisional application No. 61/537,552, filed on Sep. 21, 2011.

(51) Int. Cl.
*H04L 9/32* (2006.01)
*H04L 29/06* (2006.01)
(Continued)

(52) U.S. Cl.
CPC ........... *H04L 9/3247* (2013.01); *G06Q 20/325* (2013.01); *G06Q 20/387* (2013.01); *G06Q 20/389* (2013.01); *G06Q 20/3825* (2013.01); *G06Q 20/4014* (2013.01);
(Continued)

(58) Field of Classification Search
CPC ... H04L 9/3247; H04L 9/32; H04L 63/0823; H04L 63/0428; H04L 63/0807
See application file for complete search history.

(56) References Cited

U.S. PATENT DOCUMENTS 6,263,432 B1    7/2001    Sasmazel et al.
6,672,505 B1    1/2004    Steinmetz et al.
(Continued)

FOREIGN PATENT DOCUMENTS

EP    2336933    6/2011

OTHER PUBLICATIONS

International Patent Application PCT/US2012/056628 International Search Report and Written Opinion, May 29, 2013.
(Continued)

*Primary Examiner* — Jung Kim
*Assistant Examiner* — Ayoub Alata
(74) *Attorney, Agent, or Firm* — Greenberg Traurig LLP

(57) ABSTRACT

A computing apparatus configured to verify a digital signature applied on a set of data received from a user device, including a user ID assigned by a partner system to uniquely identify a user of the user device among customers of the partner system, and a user device identifier identifying the user device. The digital signature is generated via applying a cryptographic one-way hash function on a combination of the set of data and a secret, shared between the computing apparatus and the partner system via a secure communication channel separate from a channel used to receive the set of data.

19 Claims, 13 Drawing Sheets

(51) Int. Cl.
  *G06Q 20/32* (2012.01)
  *G06Q 20/38* (2012.01)
  *G06Q 20/40* (2012.01)
  *H04L 29/08* (2006.01)

(52) U.S. Cl.
  CPC .......... *H04L 63/0428* (2013.01); *H04L 63/08* (2013.01); *H04L 63/0823* (2013.01); *H04L 63/12* (2013.01); *H04L 67/10* (2013.01); *H04L 9/3215* (2013.01); *H04L 63/0807* (2013.01); *H04L 2209/56* (2013.01)

(56) References Cited

U.S. PATENT DOCUMENTS

| | | | |
|---|---|---|---|
| 8,838,982 | B2 | 9/2014 | Carlson et al. |
| 2002/0069179 | A1* | 6/2002 | Slater et al. ................... 705/67 |
| 2005/0074126 | A1* | 4/2005 | Stanko .......................... 380/279 |
| 2006/0080534 | A1 | 4/2006 | Yeap et al. |
| 2007/0016525 | A1 | 1/2007 | Ganesan et al. |
| 2007/0073624 | A1 | 3/2007 | Ishibashi et al. |
| 2009/0222900 | A1 | 9/2009 | Benaloh et al. |
| 2010/0145860 | A1 | 6/2010 | Pelegero |
| 2010/0250949 | A1 | 9/2010 | Torino et al. |
| 2011/0185177 | A1 | 7/2011 | Spalka et al. |
| 2013/0073859 | A1 | 3/2013 | Carlson et al. |

OTHER PUBLICATIONS

International Patent Application PCT/US12/56628, International Preliminary Report on Patentability, Mar. 25, 2014.
European Patent Application No. 12846711.5, Extended Search Report, Jul. 8, 2015.

\* cited by examiner

SYSTEMS AND METHODS TO SECURE USER IDENTIFICATION

RELATED APPLICATIONS

The present application is a continuation application of U.S. patent application Ser. No. 13/623,784, filed Sep. 20, 2012 and entitled "Systems and Methods to Secure User Identification", which claims the benefit of the filing date of Prov. U.S. Pat. App. Ser. No. 61/537,552, filed Sep. 21, 2011 and entitled "Systems and Methods to Secure User Identification", the entire disclosures of which applications hereby are incorporated herein by reference.

FIELD OF THE TECHNOLOGY

At least some embodiments of the present disclosure relate to data communications security in general and more specifically but not limited to secure referral of a user from one computing apparatus to another.

BACKGROUND

Digital signatures have been used to show the authenticity of a digital message transmitted from one computing device to another computing device. For example, digital signatures can be used to detect forgery or tampering in software distribution to ensure that the software is from the true provider of the software and the software has not been modified during the transmission from the software provider to the software user.

In one embodiment, a digital signature is generated based on the content of the communication, such as the software to be distributed, such that if the content of the communication is modified, the digital signature generated from the original content of the communication would not match with the content of the modified communication. The digital signature is also generated based on a secret, without which it is very difficult, or computationally infeasible, to generate a proper digital signature for a given communication. Thus, a properly verified digital signature indicates that the communication has not been modified, and the communication is from the entity that is in possession of the secret.

BRIEF DESCRIPTION OF THE DRAWINGS

The embodiments are illustrated by way of example and not limitation in the figures of the accompanying drawings in which like references indicate similar elements.

DETAILED DESCRIPTION

In one embodiment, a communication system is configured to allow a user device to communicate with at least two server apparatuses separately. The user device may communicate with a first server apparatus to identify information about the user of the user device (e.g., enroll the user in a program in the first server). The first server apparatus may verify and/or validate the information about the user and then refer the user to a second server apparatus for related services. The user device is configured to transmit the information about the user to the second apparatus to receive the related services.

In one embodiment, the communication system is configured to ensure that when user information received from the user device is same as the user information known to the first server apparatus (e.g., having been verified and/or validated by the first server apparatus), the user information has not been tempered with in providing to the second server apparatus; and the user of the user device is a known user of the first server apparatus.

Figure 16:
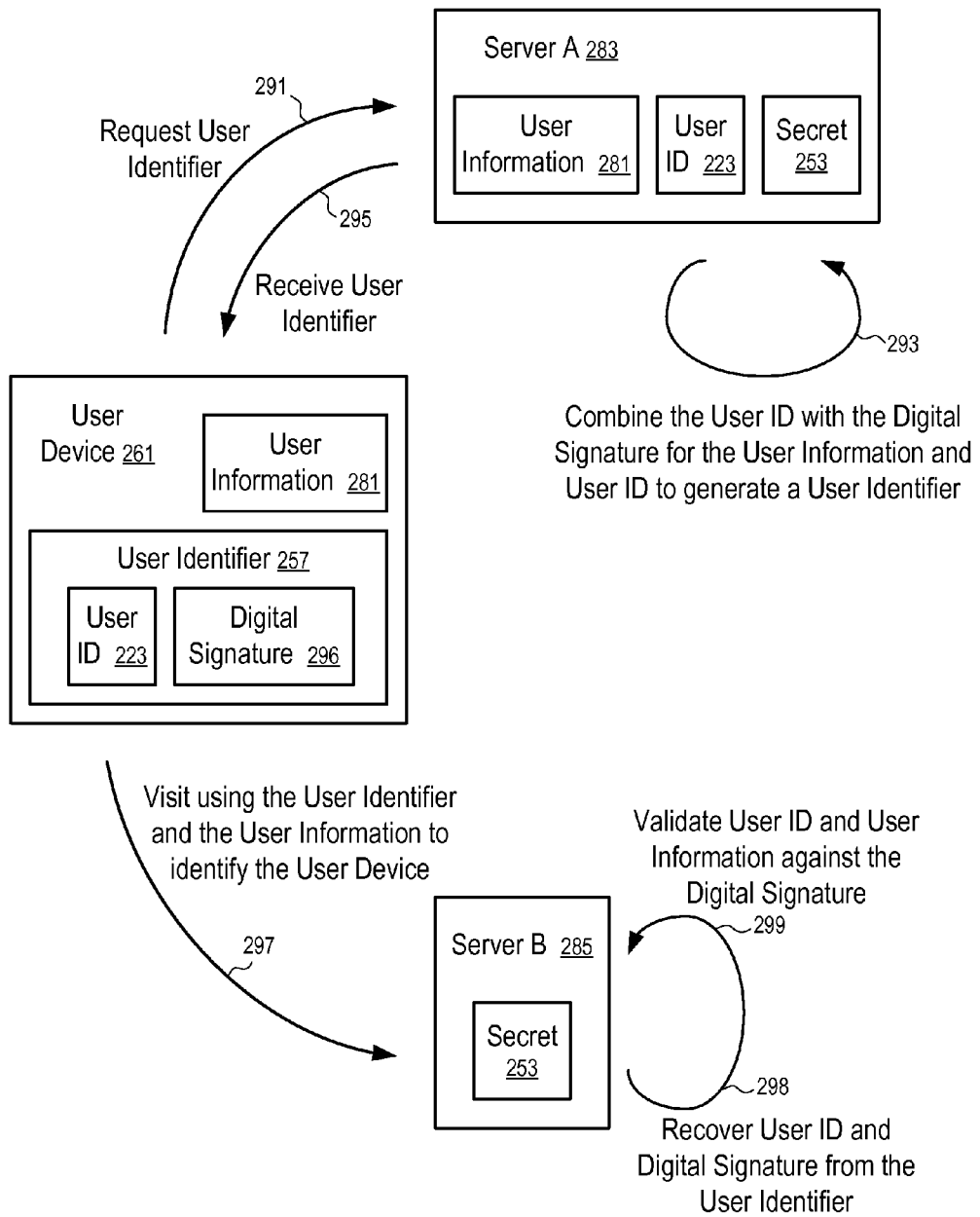
FIG. 16 shows a system to prevent unauthorized access to a computing apparatus and/or data tempering according to one embodiment.

FIG. 16 shows a system to prevent unauthorized access to a computing apparatus and/or data tempering according to one embodiment.

In FIG. 16, a user device (261) is configured to communicate with a server A (283) and a server B (285) separately. After communicating with the user device (261) to identify the user information (281), the server A (283) is configured to assign a user ID (223) to represent the user of the user device (261) and the user information (281) of the user. The user ID (223) allows the user device to access services provided on the server A (283) in relation with the user information (281).

For example, the user information (281) may identify an account of the user, a communication reference of the user, an identifier of the user device (261), etc. The server A (283) may authenticate the user, verify and/or validate at least some of the user information (281) before enrolling the user for the services provided by the server A (283). The user ID (223) represents the user as enrolled in the services of the server A (283). The server A (283) is configured to assign different user IDs (e.g., 223) to uniquely identify different users enrolled for the services provided by the server A (283). In one embodiment, the server A (283) associates different user IDs (e.g., 223) with different sets of user information (281) such that a user ID (223) uniquely identify a set of user information (281) corresponding to a user enrolled for the services provided by the server A (283).

In one embodiment, after the user device (261) is assigned the user ID (223), the user device (261) may visit the server B (285), which is separate from the server A (283), for services related to those provided by server A (283). The user device (261) is configured to provide the user information (281) to the server B (285) to obtain the related services from the server B (285).

For example, the server A (283) is configured in one embodiment to instruct the user device (261) to obtain a service from the server B (285).

For example, the user device (261) is configured in one embodiment to visit the server B (285) for a related service when certain pre-determined conditions are satisfied.

For example, the user device (261) is configured in one embodiment as a mobile computing device, such as a mobile phone, a smart phone, a personal media player, a personal digital assistant, a tablet computer, a notebook computer, etc. In one embodiment, the user device (261) is configured via an application running inside the user device (261) to access services provided by the servers (283 and 285). To receive the services, the user of the user device (261) is prompted to enroll with the server A (283); and the server B (285) is configured to provide services to users who have completed enrollment with the server A (283).

In one embodiment, prior to the user device (261) visiting the server B (285) (e.g., transmitting a request to the server B (285) for a service), the user device (261) is configured to request (291) a user identifier (257) from the server A (283) to represent the user of the user device (261). In response, the server A (283) is configured to generate a digital signature (296) on a dataset, including the user information (281) and the user ID (223), and combine (293) the digital signature (296) with the user ID (223) to generate the user identifier (257), in response to the request (291) from the user device (261). The user device (261) then receives (295) the user identifier (257) as the response to the request (291).

In one embodiment, the user device (261) is configured to separately store at least a portion of the user information (281) previously communicated to and/or from the server A (283). Thus, the user device (261) does not have to receive the user information (281) back from the server A (283) together with the user identifier (295) in the response to the request (291).

In one embodiment, the user information (281) optionally includes a portion that is assigned and/or provided by the server A (283) and provided to the user device (261) prior to the server A (283) assigning the user ID (223) to the user of the user device (261). Examples of such information include an account number, a nick name, an identifier of service(s) enrolled, etc.

In one embodiment, the user information (281) optionally includes a portion that is explicitly submitted by the user of the user device (261) to the server A (283) to identify the user. Examples of such information include a street address, a residence address, a mailing address, a communication reference for receiving communications on the user device (261), such as a mobile phone number, an email address, etc.

In one embodiment, the user information (281) optionally includes a portion that can be automatically detected from communications received from the user device (261), such as an internet protocol (IP) address of the user device (261), a Media Access Control address (MAC address) of the user device (261), an hardware identifier of the user device (261), etc.

In FIG. 16, the user device (261) is configured to visit (297) the server B (285) (e.g., by sending an HTTP request, or a request in other communications protocols), using the user identifier (257) and the user information (281) to identify the user of the user device (261). The server B (285) is configured to determine whether the visit (297) is to be allowed or rejected, based on the user identifier (257).

In one embodiment, the server B (285) is configured to recover (298), from the user identifier, the user ID (223) assigned by the server A (283) and the digital signature (296) signed by the server A (283) on the dataset in possession of the server A (283) about the user and/or the user device (261), including the user ID (223) and the user information (281). The server B (285) is configured to validate the user ID (223) recovered (298) from the user identifier (257) and the user information (281) received from the user device (261) in the visit (297), against the digital signature (296) recovered (298) from the user identifier (257).

In one embodiment, if the validation (299) of the user ID (223) and the user information (281), against the digital signature (296), is successful, the visit (297) from the user device (261) is accepted; otherwise, the visit (297) is rejected.

The successful validation (299) of the user ID (223) and the user information (281) indicates that 1) the user of the user device is one of enrolled users of server A (283), uniquely identified by the user ID (223); 2) the user ID (223) is associated with the user information (281); 3) there is no data tempering in identifying the association between the user ID (223) and the user information (281); and 4) the user ID (223) and the user information (281) as a whole received from the user device (261) are the same as what is known to the server A (283), without any modification.

In one embodiment, if the validation (299) of the user ID (223) and the user information (281), against the digital signature (296), is successful, the server B (285) is configured to provide services to the user device (261) based on the user ID (223) and/or the user information (281).

In one embodiment, the server A (283) is configured to digitally sign the dataset, including the user information (281) and the user ID (223), using the secret (253).

In one embodiment, the secret (253) is used in a symmetric-key encryption scheme to generate the digital signature (296). The secret (253) is shared between the server A (283) and the server B (285) for the verification of the digital signature (296).

For example, in one embodiment, the server A (283) is configured to generate the dataset by combining at least the user information (281), the user ID (223) and the secret (253) in a predetermined format; and a cryptographic one-way hash function, such as that based on SHA-256 designed by the National Security Agency (NSA) and published in 2001 by the National Institute of Standards and Technology (NIST) as a U.S. Federal Information Processing Standard, can be applied to the dataset to generate the digital signature (296). To verify the digital signature (296), the server B (285) is configured to re-create the digital signature (296) based on the user information (281) and the user ID (223) received at the server B (285) and compare the re-created digital signature (296) with the digital signature (296) recovered (298) from the user identifier (257) for verification.

For example, the secret (253) may be included as a portion of the dataset to generate the hash of the dataset that is based at least in part on the secret (253).

For example, the secret (253) may be used as an encryption key to encrypt a set of data including the user information (281) and the user ID (223) to generate the encrypted dataset, on which the one-way hash function is applied to generate the digital signature (296). To verify the digital signature (296), the server B (285) is configured to reconstruct a corresponding set of data including the user information (281) received from the user device (261) and the user ID (223) recovered (298) from the user identifier (257), encrypt the reconstructed set of data using the same secret (253) shared between the server A (283) and the server B (285), and apply the same one-way hash function to generate a reconstructed digital signature (296). The server B (285) is configured to compare the reconstructed digital signature (296) with the digital signature (296) recovered (298) from the user identifier (257) for verification.

In one embodiment, the dataset, including the user information (281) and the user ID (223), is hashed using a cryptographic one-way hash function; and the secret (253) is used as an encryption key to encrypt the hash result to generate the digital signature (296). To verify the digital signature (296), the server B (285) is configured to recreate the digital signature (296) using the same secret (253) in a symmetric-key encryption scheme for verification, or to decrypt the digital signature (296) recovered (298) from the user identifier (257) to determine the decrypted hash for comparison with a corresponding hash generated from the corresponding received set of data, including the user information (281) received from the user device (261) and the user ID (223) recovered (298) from the user identifier (257). The encryption and decryption of the digital signature (296) can be implemented with a symmetric-key encryption scheme using the same secret (253) shared between the server A (283) and the server B (285) or, using an asymmetric-key encryption scheme that uses a private key and a public key. In the asymmetric-key encryption scheme, the secret (283) is used as a private key in performing encryption on the hash generated by the server A (283); and the server B (285) is configured to use a public key corresponding to the private key to decrypt the digital signature (296) recovered (298) from the user identifier (257) for comparison with a corresponding hash generated by the server B (283) from at least the user information (281) received from the user device (261) and the user ID (223) recovered (298) from the user identifier (257). When the asymmetric-key encryption scheme is used, the server A (283) does not have to reveal the secret (283) to the server B (285).

In one embodiment, the user ID (223) and the digital signature (296) generated by the server A (283) are combined as a single unit of data representing the user identifier (257). Alternatively, the user device (261) may receive the user ID (223) and the digital signature (296) as two separate units of data from the server A (283) and provide the two separate units of data to the server B (285) to equivalently present the user identifier (257). In one embodiment, the user device is (261) is configured to receive the user ID (223) and the digital signature (296) as two separate units of data from the server A (283), and combine the user ID (223) and the digital signature (296) in a predetermined format to generate the user identifier (257) as a single unit of data provided in the visit (297).

In one embodiment, the digital signature (296) is valid for a limited time period. For example, the server A (283) is configured to include an indication of the current time in the dataset, for which the digital signature (296) is created. After recovering (298) the user ID (223) and the digital signature (296), the server B (285) is configured to identify, based on the time limit, one or more possible values for the time indicator used by the server A (283) in generating the digital signature (296), and verify the digital signature (296) based on the one or more possible values for the time indicator. If one of the possible values leads to a successful verification, the visit (297) can be accepted. If none of the possible values leads to a successful verification, the visit (297) can be rejected.

In one embodiment, each of the user device (261), the server A (283) and the server B (285) is implemented as a computing device having at least one processor and memory storing instructions configured to instruct the at least one processors to perform the operations described herein. In one embodiment, the computing device can be implemented using one or more data processing systems illustrated in FIG. 7.

In one embodiment, a computing apparatus is configured to use a hash of a combination of a user identifier, a secret, information identifying a user device and/or other information to verify the integrity of a request from a user redirected from a partner system, such as a merchant aggregator configured to enroll merchants and users for services that are based on transaction data of the enrolled merchants and users. Details and examples in one embodiment regarding securing user identification are provided in the section entitled "USER IDENTIFICATION."

User Identification

In one embodiment, a portal (e.g., 143 shown in FIG. 14) has a mobile enrollment web page that can be accessed with an inbound query string received from the mobile device of a user (e.g., 101 shown in FIG. 1) for enrollment in connection with a merchant aggregator (e.g., 221 shown in FIG. 14) (or other partner systems).

In one embodiment, the query string is configured to allow the portal (143) unambiguously verify that the request associated with the inbound query string is originated from the specific partner (e.g., merchant aggregator (221)), and to prevent unauthorized use of the mobile enrollment web page that is designed for activities associated with the respective partner (e.g., the merchant aggregator (221)).

In one embodiment, the partner system (e.g., the merchant aggregator (221)) is configured to provide certain information about the user (101) using a query string via redirecting the point of interaction (107) of the user (101) to visit the portal (143) using the query string. Information provided by the partner system can be used to pre-fill some fields in a page provided by the portal (143), saving effort for the user (101) in using the page (e.g., for enrolling in a program to receive messages delivered in real time with the processing of the transactions by the transaction handler (103)).

For example, the query string technique can be designed for use by a user (101) who is accessing the enrollment site from within the corresponding site of the merchant aggregator (221) in one embodiment. Prior to redirecting the user (101) to the portal (143), the merchant aggregator (221) authenticates the user (101) for a session; the merchant aggregator (221) collects information about the user (101); and when the merchant aggregator (221) has the appropriate permission to share the previously collected information with the portal (143), the merchant aggregator (221) provides the portal (143) with the information about the user (101) previously collected by the merchant aggregator (221).

In one embodiment, the portal (143) requires that the mobile enrollment web page(s) be accessed from a mobile cellular phone. When the inbound web page request (e.g., an HTTP request) visiting the mobile enrollment web page is from an individual cellular phone, the incoming request will show many different originating IP addresses, due to the proxy coverage of cell phones by the cell carrier. Further, it is possible to generate the web page request via other devices in the web at large. As a result, it is difficult to know whether the access to the mobile enrollment web page designed for the partner system (e.g., the merchant aggregator (221)) is actually coming from one of the customers of the partner system (in which case access should be granted), or coming from an unauthorized source (in which case access should be denied).

In one embodiment, a digital signature (296) technique is used to check the inbound query string to the mobile enrollment page to verify that: 1) the inbound request is from a specific customer of the partner system (e.g., the merchant aggregator (221)); 2) the customer is known to the partner system (e.g., the merchant aggregator (221)) beforehand, and 3) that the inbound request is NOT from an unauthorized source.

In one embodiment, prior to issuing an HTTPS request directed to the mobile enrollment page with the query string attached, the partner system (e.g., the merchant aggregator (221)) is configured to obtain an Enrollee User ID (EUID) and used as one of the fields in the query string. The query string is created via combining multiple fields and digitally signing the combined fields using a cryptographic hash function (e.g., SHA-256 designed by the National Security Agency (NSA) and published in 2001 by the National Institute of Standards and Technology (NIST) as a U.S. Federal Information Processing Standard) and a shared passphrase known to the partner system (e.g., the merchant aggregator (221)) and the portal (143). The digital signature (296) is combined with the ID used in the partner system (e.g., the merchant aggregator (221)) to uniquely identify the user (101) among users of the partner system. The combined ID and digital signature (296) are used in the inbound query string for the mobile enrollment page. When the portal (103) receives the inbound query string embedded in the web request to visit the mobile enrollment page, the portal (103) is configured to recreate the digital signature (296) (e.g., using the same cryptographic hash function and passphrase) and check if the recreated digital signature (296) matches the digital signature (296) received in the query string. If the digital signatures (296) match with each other, the query string is accepted; otherwise, the query string is rejected. Thus, the Enrollee User ID (EUID) (including the ID used in the partner system (e.g., the merchant aggregator (221)) to uniquely identify the user (101) among users of the partner system and the digital signature (296) for the plurality of fields) provides strong validation of:

i. the data in the query string have been originated from the partner system, ii. the data in the query string has not been tampered with or modified, iii. the specific user (101) in question is a bona fide customer of the partner system (e.g., the merchant aggregator (221)).

In one embodiment, the Enrollee User ID (EUID) is created via a passphrase that is a secret shared between the merchant aggregator (221) and the portal (143). For example, the operator of the portal (143) may provide the passphrase via an out of band channel to the operation of the merchant aggregator (221) prior to initiating of the generation of EUIDs. In one embodiment, the passphrase is kept secure and available only to the server software installed on the merchant aggregator (221) and the portal (143), which are configured to generate and verify the digital signatures (296). From time to time a new passphrase is generated and delivered to replace the old passphrase. In one embodiment, the passphrase is a one-time code (e.g., used only once for the generation of one EUID).

In one embodiment, a mobile application installed on the mobile phone of the user (101) is configured to request the EUID from the server software running on the merchant aggregator (221), as part of preparing the query string used to pre-populate the enrollment form. The request for the EUID transmitted from the mobile application to the merchant aggregator (221) includes the user ID (223), assigned by the merchant aggregator (221) and used by the mobile application to uniquely identify the user (101) of the mobile application among customers of the merchant aggregator (221). In one embodiment, the request for the EUID further identifies the phone number of the mobile phone of the user (101) on which the mobile application resides. Alternatively or in combination, the request for the EUID can include any other fields from the query string that are to be securely verified by the portal (143). In one embodiment, EUID constructed in real time in response to the request to account for changes in the source data attributes that can occur at any time.

In one embodiment, in response to the request for the EUID from the mobile application, the merchant aggregator (221) is configured (e.g., via cryptographic software and/or hardware) to combine the user ID (223), the mobile phone number, and the passphrase in a predetermined order and format into a single contiguous string, then calculate a one way hash of string using a cryptographic hash function (e.g., SHA-256). In one embodiment, the result of the one way hash is a 256-bit (32 byte) integer value that is converted to a string and appended to the user ID (223) and returned to the mobile application as the EUID being requested.

In one embodiment, the mobile application is configured to insert the received EUID into the query string at the appropriate location specified by the query string interface for the EUID. In one embodiment, the query string includes the mobile phone number per the query string specification, and is sent to the portal (143) as part of the inbound https request to the mobile enrollment form.

In one embodiment, after the portal (143) receives the inbound query string containing the EUID, the portal (143) is configured to reconstruct the EUID by obtaining the user ID (223) and mobile phone number from the query string, combine the user ID (223) with the mobile phone number, the mobile phone number obtained from the query string with the shared secret that was transmitted out-of-band in relation with the query string according to the same predetermined order and format into a single contiguous string, then calculate a one way hash of string using the same cryptographic hash function (e.g., SHA-256) as used by the merchant aggregator (221). The resulting digital signature (296) is compared with the corresponding digital signature (296) obtained from the EUID received via the query string. If the two digital signatures (296) match with each other, the EUID and the query string is accepted.

In one embodiment, the EUID is generated on the merchant aggregator (221), not on the mobile application running on the mobile device of a user, which device is not fully under the control of the merchant aggregator (221).

In one embodiment, the portal (143) includes a passphrase generator that provides the passphrase to the merchant aggregator (221) using a secure communication channel separate from the channel used to receive the query string from the mobile application.

In one embodiment, the passphrase is stored in a secure database of the portal (143) and a secure server environment on the merchant aggregator (221) and available only to authorized personnel.

Figure 14:
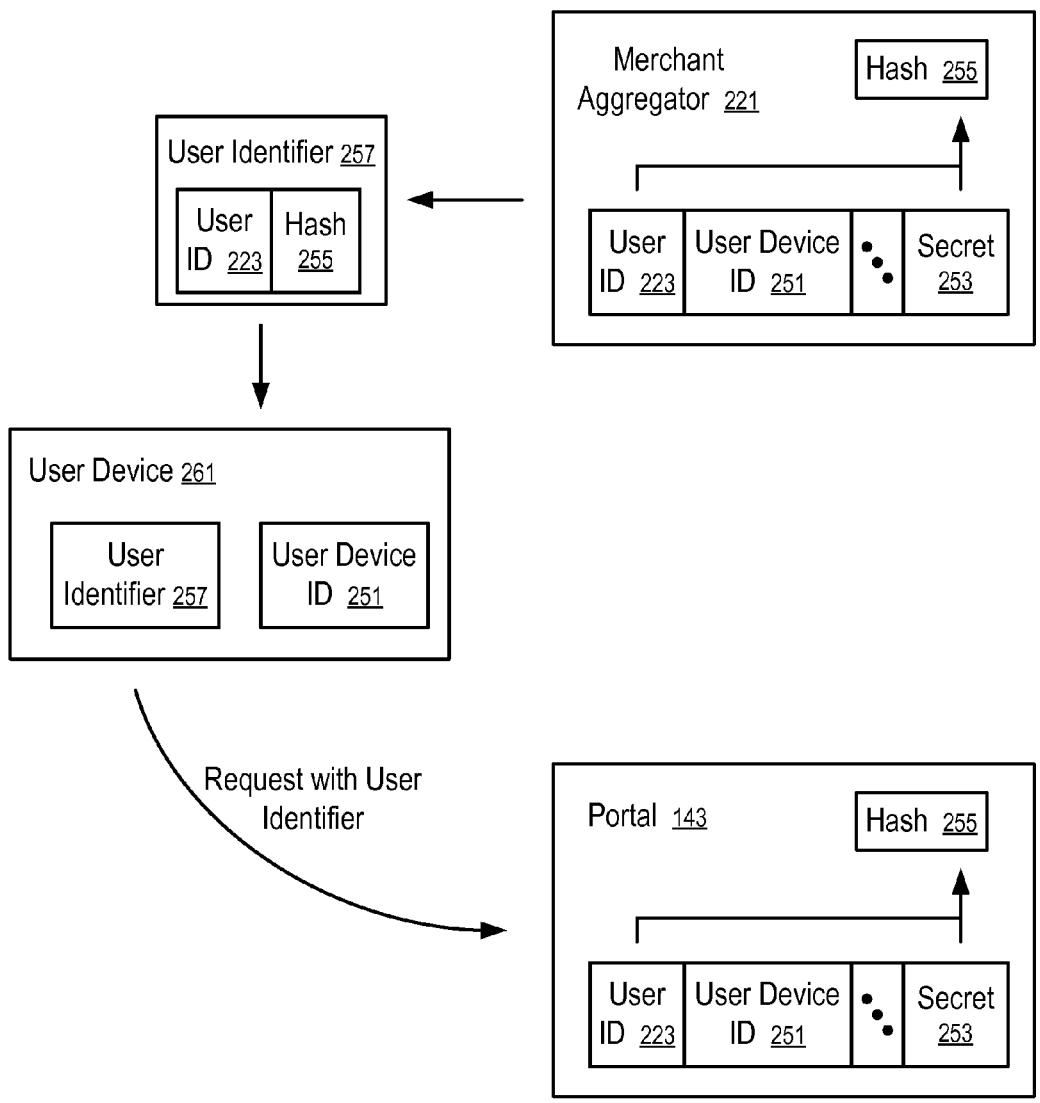
FIG. 14 shows a system to securely identify a user according to one embodiment.

FIG. 14 shows a system to securely identify a user according to one embodiment. In FIG. 14, the merchant aggregator (221) is configured to combine a set of data, including the user ID (223), a user device ID (251) and a secret (253) in a predetermined format to form a string and apply a cryptographic one-way hash function to generate the hash (255). The cryptographic hash function has a property to make it a very difficult task to modify the set of data without changing the resulting hash (255).

In FIG. 14, the user ID (223) and the hash (225) is combined in a predetermined format to generate the user identifier (257). The user ID (223) and the hash (225) can be individually identified from the user identifier (257). The user identifier (257) is provided from the merchant aggregator (221) to the user device (261) that is identified by the user device ID (251) to access the portal (143).

For example, in one embodiment, the user device (261) is a mobile phone; and the user device ID (251) is a mobile phone number of the mobile phone.

In FIG. 14, the portal (143) is configured to use the user identifier (257) to verify that the request is originated from the merchant aggregator (221). After receiving the user identifier (257) from the user device (261) in the request, the portal (143) extracts the user ID (223) and the hash (255) embedded in the user identifier (257), determine other corresponding information such as the user device ID (251), the secret (253), etc. and combine the corresponding set of data in the same predetermined format as used by the merchant aggregator (221) to form a string and apply a cryptographic one-way hash function to re-generate the hash (255) based on received information (e.g., user ID (223), user device ID (251)) and the secret (253). If the regenerated hash (255) is the same as the hash (255) provided in the user identifier (257), the request and/or the user identifier (257) is accepted; otherwise, the request and/or the user identifier (257) is rejected.

In FIG. 14, a third party (e.g., the user device (261), any unauthorized persons) does not have the secret (253) that is shared by the merchant aggregator (221) and the portal (143) via out-of-band communication. Thus, a third party is able to provide the hash (255) that can be recreated by the portal (143); and therefore, a match hash (255) recreated by the portal (143) indicates that the user identifier (257) is from the merchant aggregator (221).

Further, in FIG. 14, the use of the cryptographic one-way hash function prevents any tempering with the user ID (223). If the data, such as the user ID (223), user device ID (251) and/or other data fields used to create the hash (255) is modified upon arrival at the portal (143), the hash (255) recreated with the modified data would not match the hash (255) provided in the user identifier (257); and without the secret (253), the third party cannot modify the hash (255) in the user identifier (257) to cause the portal (143) to recreate the same hash (255) from the modified data.

Thus, the system illustrated in FIG. 14 allows a secure redirecting of a user from the merchant aggregator (221) to the portal (143).

In one embodiment, the user device ID (251) is transmitted from the merchant aggregator (221) to the portal (143) via the request redirected to the portal (143). The data used to create the hash may include other information to be passed from the merchant aggregator (221) to the portal (143), such as the email, residence and/or mailing address of the user (101).

In one embodiment, the user device ID (251) is not directly transmitted from the merchant aggregator (221) to the portal (143). For example, the query string may not include the phone number of the mobile phone; and the portal (143) is configured to determine the phone number based on the origin of the request. Thus, when the request is not received from the mobile phone at the corresponding phone number, the regenerated hash (255) does not the hash (255) extracted from the user identifier (257).

Figure 15:
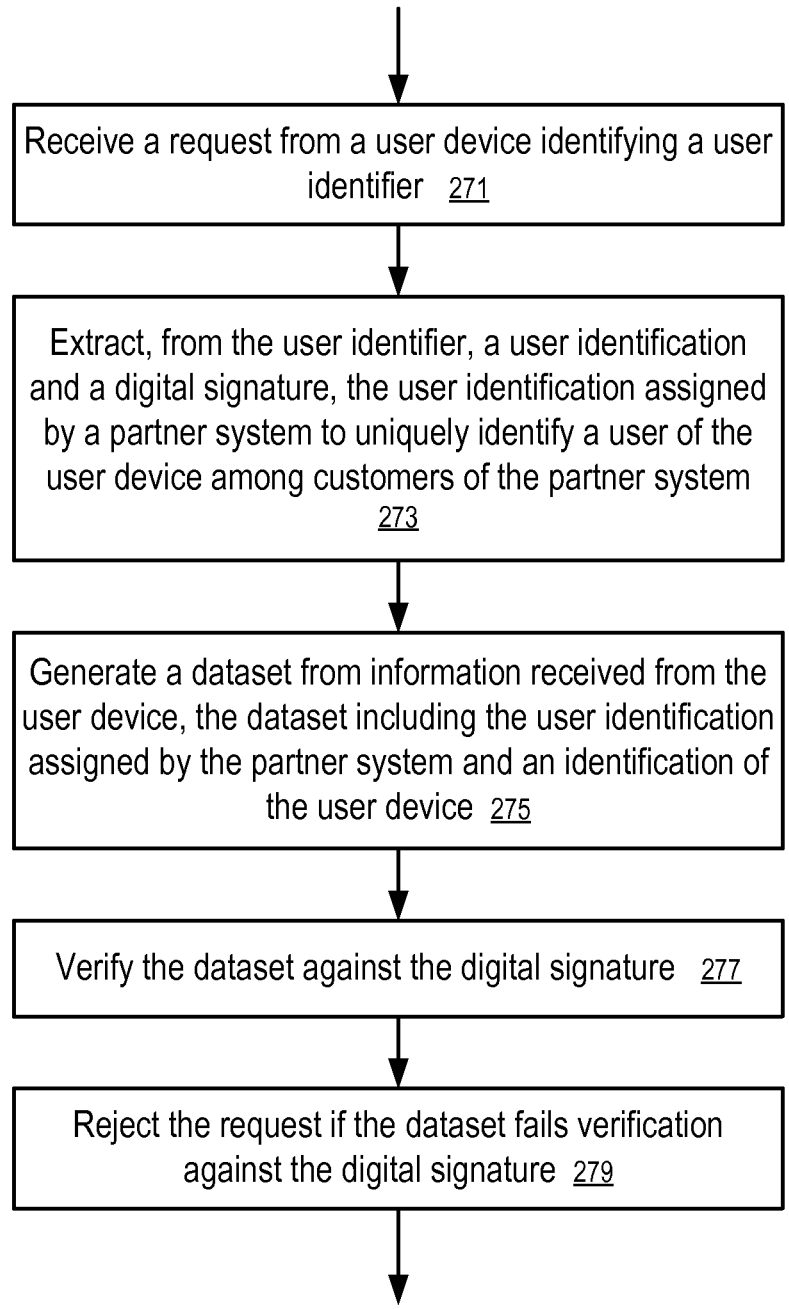
FIG. 15 shows a method to securely identify a user according to one embodiment.

FIG. 15 shows a method to securely identify a user according to one embodiment. In FIG. 15, a computing apparatus is configured to receive (271) a request from a user device (261) identifying a user identifier (257); extract (273), from the user identifier (257), a user identification (223) and a digital signature (296) (e.g., hash (255)), the user identification (223) assigned by a partner system (e.g., merchant aggregator (221)) to uniquely identify a user (101) of the user device (261) among customers of the partner system (e.g., merchant aggregator (221)); generate (275) a dataset (e.g., 223, 251, . . . ) from information received from the user device (251), the dataset (e.g., 223, 251, . . . ) including the user identification (223) assigned by the partner system (e.g., merchant aggregator (221)) and an identification (251) of the user device (261); verify (277) the dataset (e.g., 223, 251, . . . ) against the digital signature (296) (e.g., hash (255)); and reject (279) the request if the dataset (e.g., 223, 251, . . . ) fails verification against the digital signature (296) (e.g., hash (255)).

Figure 7:
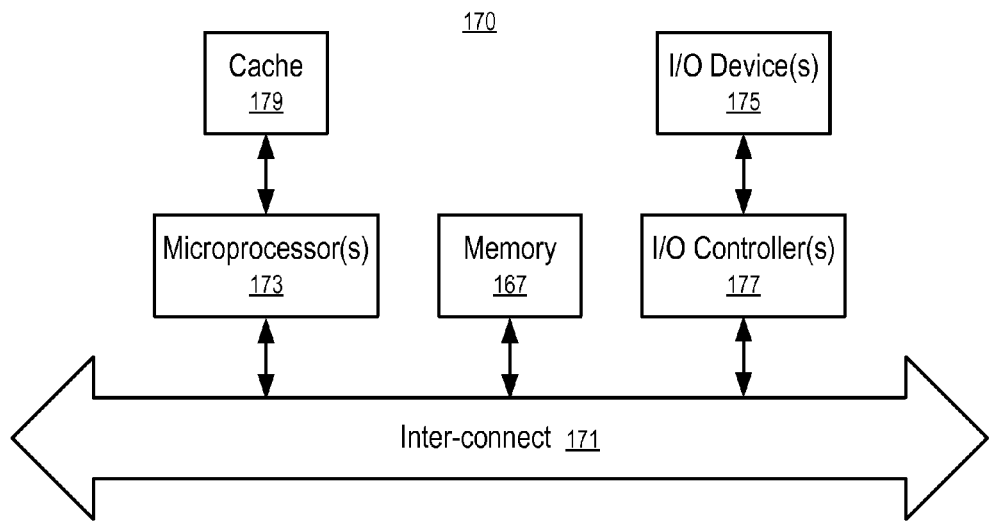
FIG. 7 illustrates a data processing system according to one embodiment.

In one embodiment, the computing apparatus has at least one microprocessor and a memory storing instructions configured to instruct the at least one microprocessor to perform operations. The computing apparatus/system includes at least one of: the portal (143), the merchant aggregator (221), the user device (261), the server A (283), the server B (285), the data warehouse (149), the media controller (115), the message broker (201), and the transaction handler (103), each of which can be implemented using one or more data processing systems as illustrated in FIG. 7. In one embodiment, the user device (261) includes a point of interaction (107) as discussed in the section entitled "POINT OF INTERACTION".

Some details about the system in one embodiment are provided in the sections entitled "SYSTEM," "CENTRALIZED DATA WAREHOUSE" and "HARDWARE."

Transaction Data Based Services

In one embodiment, transaction data, such as records of transactions made via credit accounts, debit accounts, pre-paid accounts, bank accounts, stored value accounts and the like, is processed to provide information for various services, such as reporting, benchmarking, advertising, content or offer selection, customization, personalization, prioritization, etc. In one embodiment, users are required to enroll in a service program and provide consent to allow the system to use related transaction data and/or other data for the related services. The system is configured to provide the services while protecting the privacy of the users in accordance with the enrollment agreement and user consent.

In one embodiment, an advertising network is provided based on a transaction handler to present personalized or targeted advertisements/offers on behalf of advertisers. A computing apparatus of, or associated with, the transaction handler uses the transaction data and/or other data, such as account data, merchant data, search data, social networking data, web data, etc., to develop intelligence information about individual customers, or certain types or groups of customers. The intelligence information can be used to select, identify, generate, adjust, prioritize, and/or personalize advertisements/offers to the customers. In one embodiment, the transaction handler is further automated to process the advertisement fees charged to the advertisers, using the accounts of the advertisers, in response to the advertising activities.

In one embodiment, the computing apparatus is to generate trigger records for a transaction handler to identify authorization requests that satisfy the conditions specified in the trigger records, identify communication references of the users associated with the identified authorization requests, and use the communication references to target real-time messages at the users in parallel with the transaction handler providing responses to the respective authorization requests. Details in one embodiment regarding the generation and delivery of messages in real-time with the processing of transactions are provided in the section entitled "REAL-TIME MESSAGES."

In one embodiment, the computing apparatus is configured to provide transaction information about transactions between enrolled merchants and enrolled account holders to a merchant aggregator, which enrolls the merchants and account holders for enhanced communications with merchants and account holders. The transaction information is provided in real time or concurrently with the processing of the respective transaction requests at the transaction handler. Details and examples in one embodiment regarding the communication via the merchant aggregator are provided in the section entitled "MERCHANT AGGREGATOR."

In one embodiment, the computing apparatus correlates transactions with activities that occurred outside the context of the transaction, such as online advertisements presented to the customers that at least in part cause offline transactions. The correlation data can be used to demonstrate the success of the advertisements, and/or to improve intelligence information about how individual customers and/or various types or groups of customers respond to the advertisements.

In one embodiment, the computing apparatus correlates, or provides information to facilitate the correlation of, transactions with online activities of the customers, such as searching, web browsing, social networking and consuming advertisements, with other activities, such as watching television programs, and/or with events, such as meetings, announcements, natural disasters, accidents, news announcements, etc.

In one embodiment, the correlation results are used in predictive models to predict transactions and/or spending patterns based on activities or events, to predict activities or events based on transactions or spending patterns, to provide alerts or reports, etc.

In one embodiment, a single entity operating the transaction handler performs various operations in the services provided based on the transaction data. For example, in the presentation of the personalized or targeted advertisements, the single entity may perform the operations such as generating the intelligence information, selecting relevant intelligence information for a given audience, selecting, identifying, adjusting, prioritizing, personalizing and/or generating advertisements based on selected relevant intelligence information, and facilitating the delivery of personalized or targeted advertisements, etc. Alternatively, the entity operating the transaction handler cooperates with one or more other entities by providing information to these entities to allow these entities to perform at least some of the operations for presentation of the personalized or targeted advertisements.

System

Figure 1:
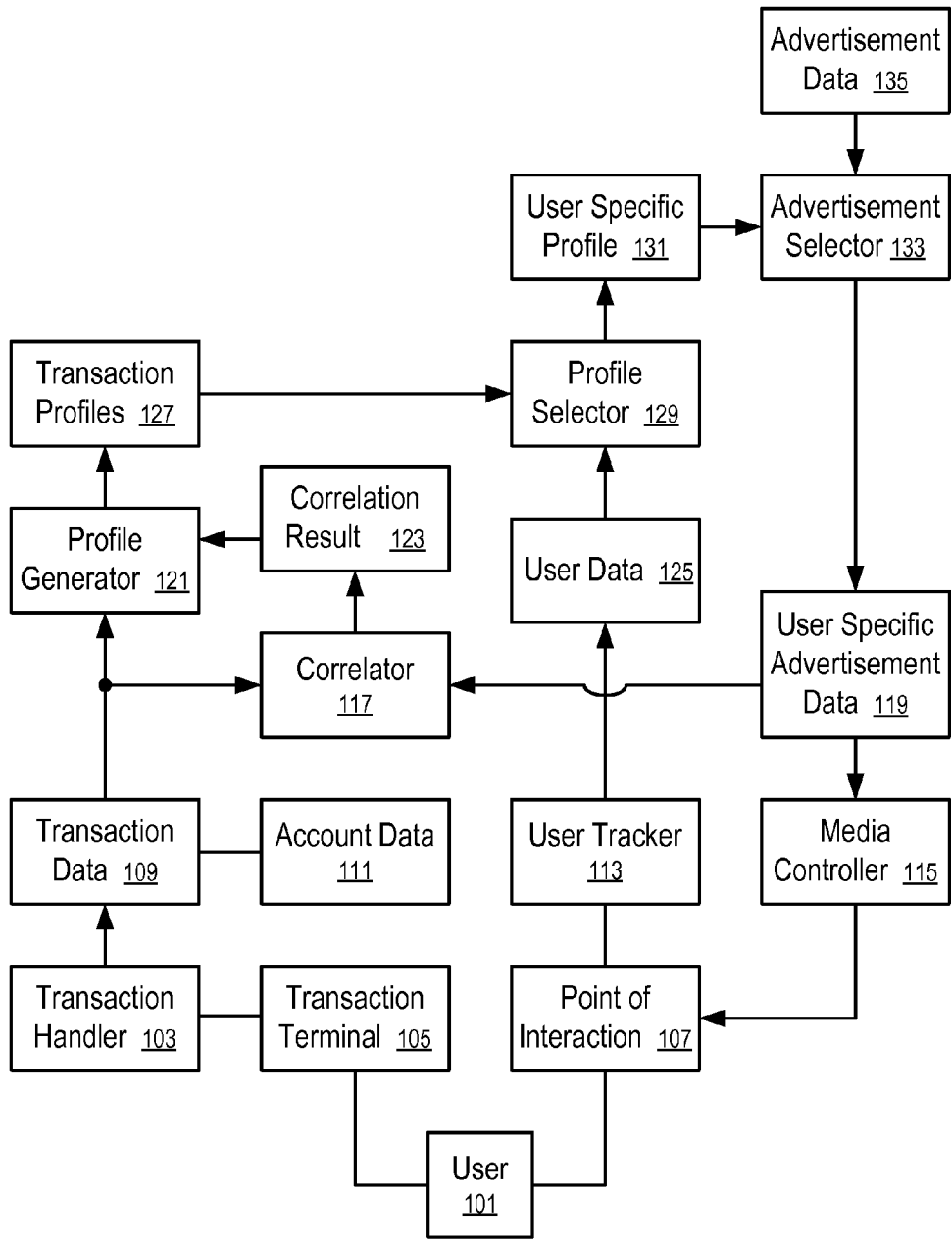
FIG. 1 illustrates a system to provide services based on transaction data according to one embodiment.

FIG. 1 illustrates a system to provide services based on transaction data according to one embodiment. In FIG. 1, the system includes a transaction terminal (105) to initiate financial transactions for a user (101), a transaction handler (103) to generate transaction data (109) from processing the financial transactions of the user (101) (and the financial transactions of other users), a profile generator (121) to generate transaction profiles (127) based on the transaction data (109) to provide information/intelligence about user preferences and spending patterns, a point of interaction (107) to provide information and/or offers to the user (101), a user tracker (113) to generate user data (125) to identify the user (101) using the point of interaction (107), a profile selector (129) to select a profile (131) specific to the user (101) identified by the user data (125), and an advertisement selector (133) to select, identify, generate, adjust, prioritize and/or personalize advertisements for presentation to the user (101) on the point of interaction (107) via a media controller (115).

In one embodiment, the system further includes a correlator (117) to correlate user specific advertisement data (119) with transactions resulting from the user specific advertisement data (119). The correlation results (123) can be used by the profile generator (121) to improve the transaction profiles (127).

Figure 2:
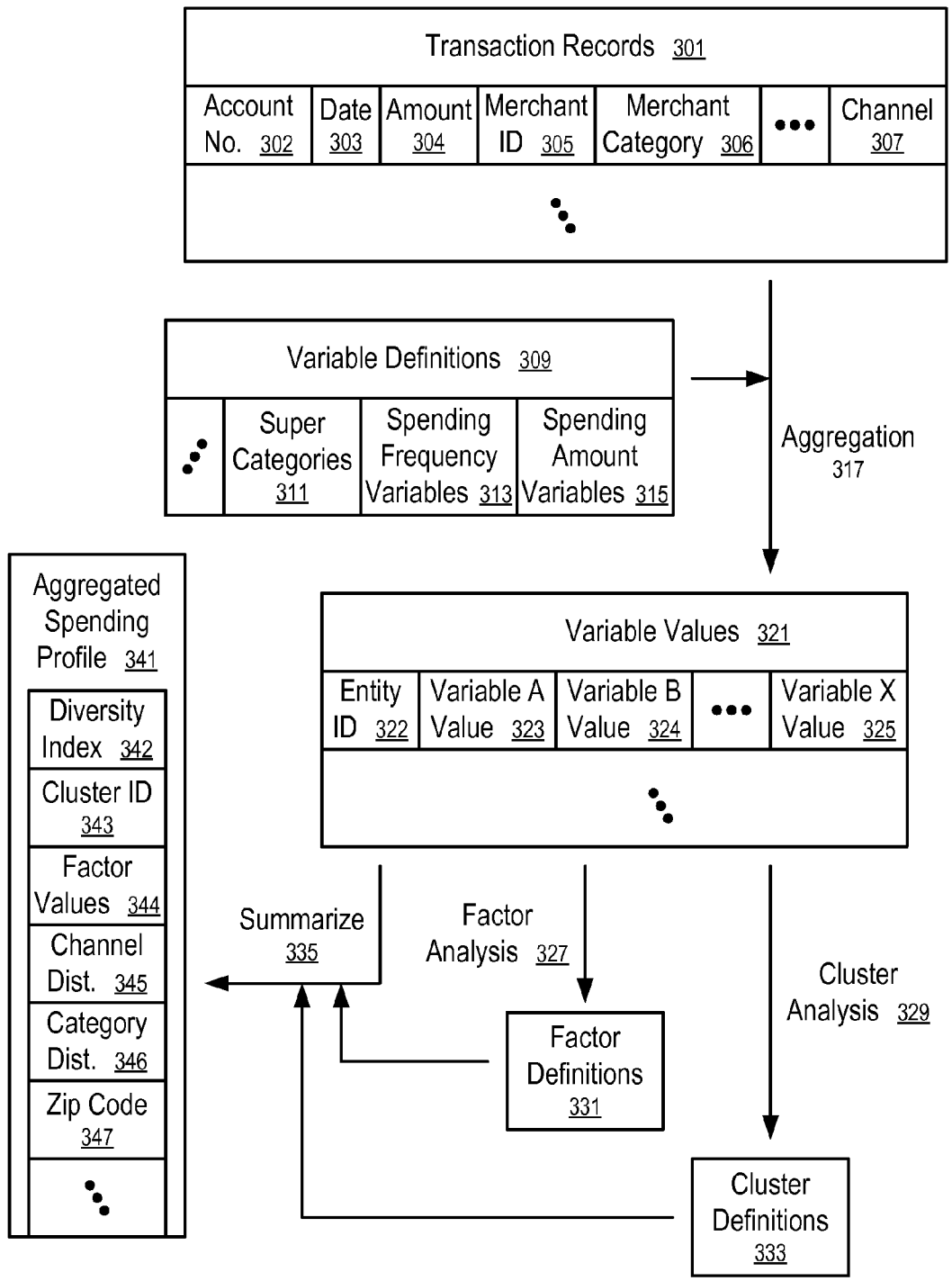
FIG. 2 illustrates the generation of an aggregated spending profile according to one embodiment.
Figure 3:
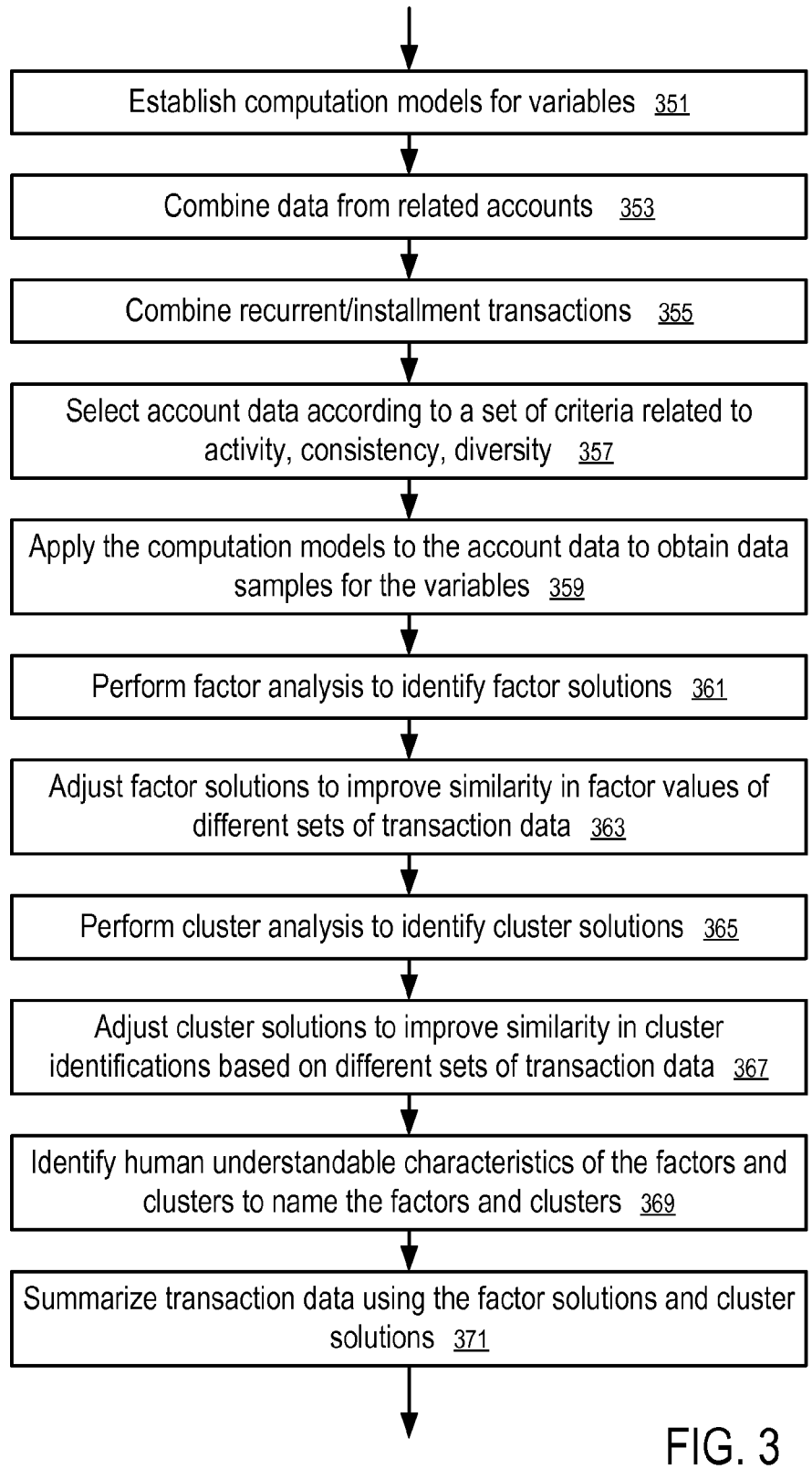
FIG. 3 shows a method to generate an aggregated spending profile according to one embodiment.

In one embodiment, the transaction profiles (127) are generated from the transaction data (109) in a way as illustrated in FIGS. 2 and 3. For example, in FIG. 3, an aggregated spending profile (341) is generated via the factor analysis (327) and cluster analysis (329) to summarize (335) the spending patterns/behaviors reflected in the transaction records (301).

Figure 4:
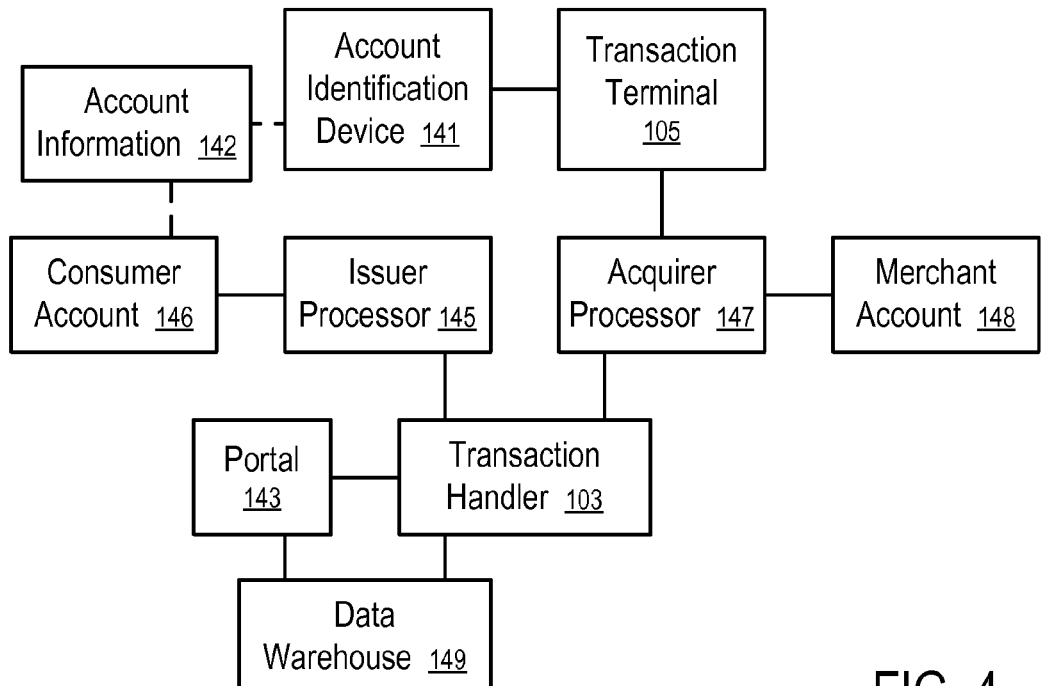
FIG. 4 shows a system to provide information based on transaction data according to one embodiment.

In one embodiment, a data warehouse (149) as illustrated in FIG. 4 is coupled with the transaction handler (103) to store the transaction data (109) and other data, such as account data (111), transaction profiles (127) and correlation results (123). In FIG. 4, a portal (143) is coupled with the data warehouse (149) to provide data or information derived from the transaction data (109), in response to a query request from a third party or as an alert or notification message.

In FIG. 4, the transaction handler (103) is coupled between an issuer processor (145) in control of a consumer account (146) and an acquirer processor (147) in control of a merchant account (148). An account identification device (141) is configured to carry the account information (142) that identifies the consumer account (146) with the issuer processor (145) and provide the account information (142) to the transaction terminal (105) of a merchant to initiate a transaction between the user (101) and the merchant.

Figure 5:
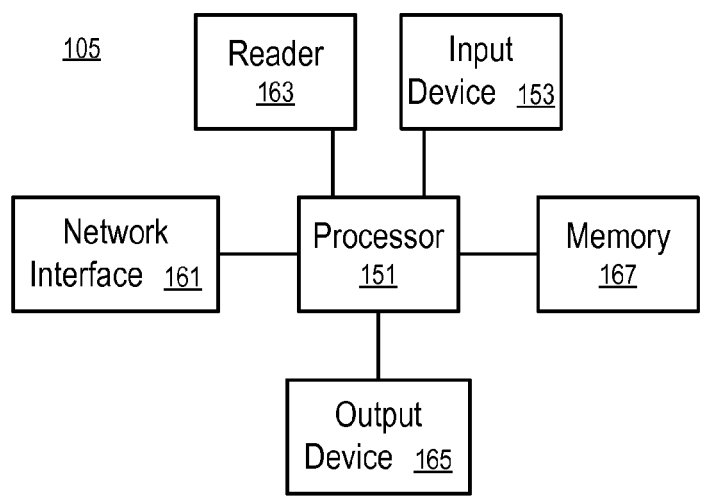
FIG. 5 illustrates a transaction terminal according to one embodiment.
Figure 6:
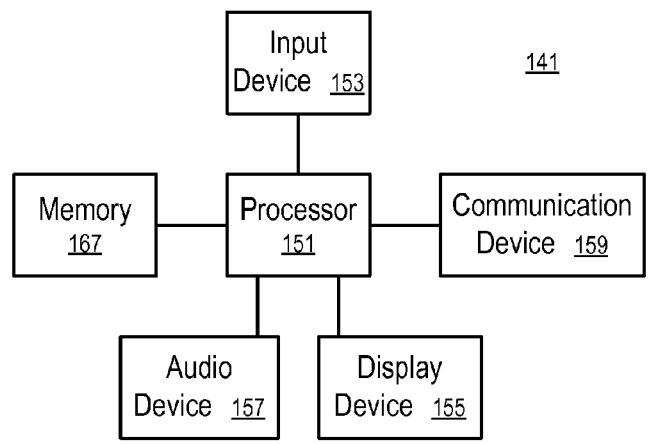
FIG. 6 illustrates an account identifying device according to one embodiment.

FIGS. 5 and 6 illustrate examples of transaction terminals (105) and account identification devices (141). FIG. 7 illustrates the structure of a data processing system that can be used to implement, with more or fewer elements, at least some of the components in the system, such as the point of interaction (107), the transaction handler (103), the portal (143), the data warehouse (149), the account identification device (141), the transaction terminal (105), the user tracker (113), the profile generator (121), the profile selector (129), the advertisement selector (133), the media controller (115), etc. Some embodiments use more or fewer components than those illustrated in FIGS. 1 and 4-7, as further discussed in the section entitled "VARIATIONS."

In one embodiment, the transaction data (109) relates to financial transactions processed by the transaction handler (103); and the account data (111) relates to information about the account holders involved in the transactions. Further data, such as merchant data that relates to the location, business, products and/or services of the merchants that receive payments from account holders for their purchases, can be used in the generation of the transaction profiles (127, 341).

In one embodiment, the financial transactions are made via an account identification device (141), such as financial transaction cards (e.g., credit cards, debit cards, banking cards, etc.); the financial transaction cards may be embodied in various devices, such as plastic cards, chips, radio frequency identification (RFID) devices, mobile phones, personal digital assistants (PDAs), etc.; and the financial transaction cards may be represented by account identifiers (e.g., account numbers or aliases). In one embodiment, the financial transactions are made via directly using the account information (142), without physically presenting the account identification device (141).

Further features, modifications and details are provided in various sections of this description.

Centralized Data Warehouse

In one embodiment, the transaction handler (103) maintains a centralized data warehouse (149) organized around the transaction data (109). For example, the centralized data warehouse (149) may include, and/or support the determination of, spending band distribution, transaction count and amount, merchant categories, merchant by state, cardholder segmentation by velocity scores, and spending within merchant target, competitive set and cross-section.

In one embodiment, the centralized data warehouse (149) provides centralized management but allows decentralized execution. For example, a third party strategic marketing analyst, statistician, marketer, promoter, business leader, etc., may access the centralized data warehouse (149) to analyze customer and shopper data, to provide follow-up analyses of customer contributions, to develop propensity models for increased conversion of marketing campaigns, to develop segmentation models for marketing, etc. The centralized data warehouse (149) can be used to manage advertisement campaigns and analyze response profitability.

In one embodiment, the centralized data warehouse (149) includes merchant data (e.g., data about sellers), customer/business data (e.g., data about buyers), and transaction records (301) between sellers and buyers over time. The centralized data warehouse (149) can be used to support corporate sales forecasting, fraud analysis reporting, sales/customer relationship management (CRM) business intelligence, credit risk prediction and analysis, advanced authorization reporting, merchant benchmarking, business intelligence for small business, rewards, etc.

In one embodiment, the transaction data (109) is combined with external data, such as surveys, benchmarks, search engine statistics, demographics, competition information, emails, etc., to flag key events and data values, to set customer, merchant, data or event triggers, and to drive new transactions and new customer contacts.

Transaction Profile

In FIG. 1, the profile generator (121) generates transaction profiles (127) based on the transaction data (109), the account data (111), and/or other data, such as non-transactional data, wish lists, merchant provided information, address information, information from social network websites, information from credit bureaus, information from search engines, and other examples discussed in U.S. patent application Ser. No. 12/614,603, filed Nov. 9, 2009, published as U.S. Pat. App. Pub. No. 2011/0054981, and entitled "Analyzing Local Non-Transactional Data with Transactional Data in Predictive Models," the disclosure of which is hereby incorporated herein by reference.

In one embodiment, the transaction profiles (127) provide intelligence information on the behavior, pattern, preference, propensity, tendency, frequency, trend, and budget of the user (101) in making purchases. In one embodiment, the transaction profiles (127) include information about what the user (101) owns, such as points, miles, or other rewards currency, available credit, and received offers, such as coupons loaded into the accounts of the user (101). In one embodiment, the transaction profiles (127) include information based on past offer/coupon redemption patterns. In one embodiment, the transaction profiles (127) include information on shopping patterns in retail stores as well as online, including frequency of shopping, amount spent in each shopping trip, distance of merchant location (retail) from the address of the account holder(s), etc.

In one embodiment, the transaction handler (103) provides at least part of the intelligence for the prioritization, generation, selection, customization and/or adjustment of an advertisement for delivery within a transaction process involving the transaction handler (103). For example, the advertisement may be presented to a customer in response to the customer making a payment via the transaction handler (103).

Some of the transaction profiles (127) are specific to the user (101), or to an account of the user (101), or to a group of users of which the user (101) is a member, such as a household, family, company, neighborhood, city, or group identified by certain characteristics related to online activities, offline purchase activities, merchant propensity, etc.

In one embodiment, the profile generator (121) generates and updates the transaction profiles (127) in batch mode periodically. In other embodiments, the profile generator (121) generates the transaction profiles (127) in real-time, or just in time, in response to a request received in the portal (143) for such profiles.

In one embodiment, the transaction profiles (127) include the values for a set of parameters. Computing the values of the parameters may involve counting transactions that meet one or more criteria, and/or building a statistically-based model in which one or more calculated values or transformed values are put into a statistical algorithm that weights each value to optimize its collective predictiveness for various predetermined purposes.

Further details and examples about the transaction profiles (127) in one embodiment are provided in the section entitled "AGGREGATED SPENDING PROFILE."

Non-Transactional Data

In one embodiment, the transaction data (109) is analyzed in connection with non-transactional data to generate transaction profiles (127) and/or to make predictive models.

In one embodiment, transactions are correlated with non-transactional events, such as news, conferences, shows, announcements, market changes, natural disasters, etc. to establish cause and effect relationships to predict future transactions or spending patterns. For example, non-transactional data may include the geographic location of a news event, the date of an event from an events calendar, the name of a performer for an upcoming concert, etc. The non-transactional data can be obtained from various sources, such as newspapers, websites, blogs, social networking sites, etc.

In one embodiment, when the cause and effect relationships between the transactions and non-transactional events are known (e.g., based on prior research results, domain knowledge, expertise), the relationships can be used in predictive models to predict future transactions or spending patterns, based on events that occurred recently or are happening in real-time.

In one embodiment, the non-transactional data relates to events that happened in a geographical area local to the user (101) that performed the respective transactions. In one embodiment, a geographical area is local to the user (101) when the distance from the user (101) to locations in the geographical area is within a convenient range for daily or regular travel, such as 20, 50 or 100 miles from an address of the user (101), or within the same city or zip code area of an address of the user (101). Examples of analyses of local non-transactional data in connection with transaction data (109) in one embodiment are provided in U.S. patent application Ser. No. 12/614,603, filed Nov. 9, 2009, published as U.S. Pat. App. Pub. No. 2011/0054981, and entitled "Analyzing Local Non-Transactional Data with Transactional Data in Predictive Models," the disclosure of which is hereby incorporated herein by reference.

In one embodiment, the non-transactional data is not limited to local non-transactional data. For example, national non-transactional data can also be used.

In one embodiment, the transaction records (301) are analyzed in frequency domain to identify periodic features in spending events. The periodic features in the past transaction records (301) can be used to predict the probability of a time window in which a similar transaction will occur. For example, the analysis of the transaction data (109) can be used to predict when a next transaction having the periodic feature will occur, with which merchant, the probability of a repeated transaction with a certain amount, the probability of exception, the opportunity to provide an advertisement or offer such as a coupon, etc. In one embodiment, the periodic features are detected through counting the number of occurrences of pairs of transactions that occurred within a set of predetermined time intervals and separating the transaction pairs based on the time intervals. Some examples and techniques for the prediction of future transactions based on the detection of periodic features in one embodiment are provided in U.S. Pat. App. Pub. No. 2010/0280882, entitled "Frequency-Based Transaction Prediction and Processing," the disclosure of which is hereby incorporated herein by reference.

Techniques and details of predictive modeling in one embodiment are provided in U.S. Pat. Nos. 6,119,103, 6,018,723, 6,658,393, 6,598,030, and 7,227,950, the disclosures of which are hereby incorporated herein by reference.

In one embodiment, offers are based on the point-of-service to offeree distance to allow the user (101) to obtain in-person services. In one embodiment, the offers are selected based on transaction history and shopping patterns in the transaction data (109) and/or the distance between the user (101) and the merchant. In one embodiment, offers are provided in response to a request from the user (101), or in response to a detection of the location of the user (101). Examples and details of at least one embodiment are provided in U.S. Pat. App. Pub. No. 2008/0319843, entitled "Supply of Requested Offer Based on Point-of Service to Offeree Distance," U.S. Pat. App. Pub. No. 2008/0300973, entitled "Supply of Requested Offer Based on Offeree Transaction History," U.S. Pat. App. Pub. No. 2009/0076896, entitled "Merchant Supplied Offer to a Consumer within a Predetermined Distance," U.S. Pat. App. Pub. No. 2009/0076925, entitled "Offeree Requested Offer Based on Point-of Service to Offeree Distance," and U.S. Pat. App. Pub. No. 2010/0274627, entitled "Receiving an Announcement Triggered by Location Data," the disclosures of which applications are hereby incorporated herein by reference.

Targeting Advertisement

In FIG. 1, an advertisement selector (133) prioritizes, generates, selects, adjusts, and/or customizes the available advertisement data (135) to provide user specific advertisement data (119) based at least in part on the user specific profile (131). The advertisement selector (133) uses the user specific profile (131) as a filter and/or a set of criteria to generate, identify, select and/or prioritize advertisement data for the user (101). A media controller (115) delivers the user specific advertisement data (119) to the point of interaction (107) for presentation to the user (101) as the targeted and/or personalized advertisement.

In one embodiment, the user data (125) includes the characterization of the context at the point of interaction (107). Thus, the use of the user specific profile (131), selected using the user data (125), includes the consideration of the context at the point of interaction (107) in selecting the user specific advertisement data (119).

In one embodiment, in selecting the user specific advertisement data (119), the advertisement selector (133) uses not only the user specific profile (131), but also information regarding the context at the point of interaction (107). For example, in one embodiment, the user data (125) includes information regarding the context at the point of interaction (107); and the advertisement selector (133) explicitly uses the context information in the generation or selection of the user specific advertisement data (119).

In one embodiment, the advertisement selector (133) may query for specific information regarding the user (101) before providing the user specific advertisement data (119). The queries may be communicated to the operator of the transaction handler (103) and, in particular, to the transaction handler (103) or the profile generator (121). For example, the queries from the advertisement selector (133) may be transmitted and received in accordance with an application programming interface or other query interface of the transaction handler (103), the profile generator (121) or the portal (143) of the transaction handler (103).

In one embodiment, the queries communicated from the advertisement selector (133) may request intelligence information regarding the user (101) at any level of specificity (e.g., segment level, individual level). For example, the queries may include a request for a certain field or type of information in a cardholder's aggregated spending profile (341). As another example, the queries may include a request for the spending level of the user (101) in a certain merchant category over a prior time period (e.g., six months).

In one embodiment, the advertisement selector (133) is operated by an entity that is separate from the entity that operates the transaction handler (103). For example, the advertisement selector (133) may be operated by a search engine, a publisher, an advertiser, an ad network, or an online merchant. The user specific profile (131) is provided to the advertisement selector (133) to assist in the customization of the user specific advertisement data (119).

In one embodiment, advertising is targeted based on shopping patterns in a merchant category (e.g., as represented by a Merchant Category Code (MCC)) that has high correlation of spending propensity with other merchant categories (e.g., other MCCs). For example, in the context of a first MCC for a targeted audience, a profile identifying second MCCs that have high correlation of spending propensity with the first MCC can be used to select advertisements for the targeted audience.

In one embodiment, the aggregated spending profile (341) is used to provide intelligence information about the spending patterns, preferences, and/or trends of the user (101). For example, a predictive model can be established based on the aggregated spending profile (341) to estimate the needs of the user (101). For example, the factor values (344) and/or the cluster ID (343) in the aggregated spending profile (341) can be used to determine the spending preferences of the user (101). For example, the channel distribution (345) in the aggregated spending profile (341) can be used to provide a customized offer targeted for a particular channel, based on the spending patterns of the user (101).

In one embodiment, mobile advertisements, such as offers and coupons, are generated and disseminated based on aspects of prior purchases, such as timing, location, and nature of the purchases, etc. In one embodiment, the size of the benefit of the offer or coupon is based on purchase volume or spending amount of the prior purchase and/or the subsequent purchase that may qualify for the redemption of the offer. Further details and examples of one embodiment are provided in U.S. Pat. App. Pub. No. 2008/0201226, entitled "Mobile Coupon Method and Portable Consumer Device for Utilizing same," the disclosure of which is hereby incorporated herein by reference.

In one embodiment, conditional rewards are provided to the user (101); and the transaction handler (103) monitors the transactions of the user (101) to identify redeemable rewards that have satisfied the respective conditions. In one embodiment, the conditional rewards are selected based on transaction data (109). Further details and examples of one embodiment are provided in U.S. Pat. App. Pub. No. 2008/0082418, entitled "Consumer Specific Conditional Rewards," the disclosure of which is hereby incorporated herein by reference. The techniques to detect the satisfied conditions of conditional rewards can also be used to detect the transactions that satisfy the conditions specified to locate the transactions that result from online activities, such as online advertisements, searches, etc., to correlate the transactions with the respective online activities.

Further details about targeted offer delivery in one embodiment are provided in U.S. Pat. App. Pub. No. 2010/0030644, entitled "Targeted Advertising by Payment Processor History of Cashless Acquired Merchant Transaction on Issued Consumer Account," and in U.S. Pat. App. Pub. No. 2011/0035280, entitled "Systems and Methods for Targeted Advertisement Delivery," the disclosures of which applications are hereby incorporated herein by reference.

Loyalty Program

In one embodiment, the transaction handler (103) uses the account data (111) to store information for third party loyalty programs. The transaction handler (103) processes payment transactions made via financial transaction cards, such as credit cards, debit cards, banking cards, etc.; and the financial transaction cards can be used as loyalty cards for the respective third party loyalty programs. Since the third party loyalty programs are hosted on the transaction handler (103), the consumers do not have to carry multiple, separate loyalty cards (e.g., one for each merchant that offers a loyalty program); and the merchants do not have to incur a large setup and investment fee to establish the loyalty program. The loyalty programs hosted on the transaction handler (103) can provide flexible awards for consumers, retailers, manufacturers, issuers, and other types of business entities involved in the loyalty programs. The integration of the loyalty programs into the accounts of the customers on the transaction handler (103) allows new offerings, such as merchant cross-offerings or bundling of loyalty offerings.

In one embodiment, an entity operating the transaction handler (103) hosts loyalty programs for third parties using the account data (111) of the users (e.g., 101). A third party, such as a merchant, retailer, manufacturer, issuer or other entity that is interested in promoting certain activities and/or behaviors, may offer loyalty rewards on existing accounts of consumers. The incentives delivered by the loyalty programs can drive behavior changes without the hassle of loyalty card creation. In one embodiment, the loyalty programs hosted via the accounts of the users (e.g., 101) of the transaction handler (103) allow the consumers to carry fewer cards and may provide more data to the merchants than traditional loyalty programs.

The loyalty programs integrated with the accounts of the users (e.g., 101) of the transaction handler (103) can provide tools to enable nimble programs that are better aligned for driving changes in consumer behaviors across transaction channels (e.g., online, offline, via mobile devices). The loyalty programs can be ongoing programs that accumulate benefits for customers (e.g., points, miles, cash back), and/or programs that provide one time benefits or limited time benefits (e.g., rewards, discounts, incentives).

Figure 8:
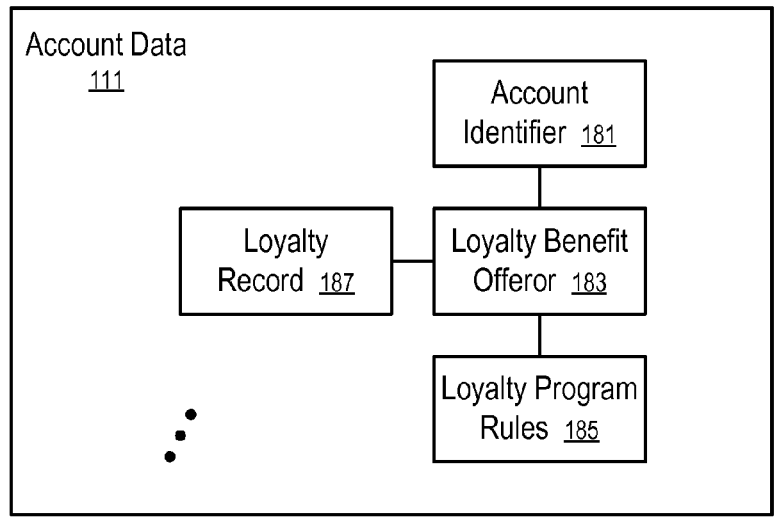
FIG. 8 shows the structure of account data for providing loyalty programs according to one embodiment.

FIG. 8 shows the structure of account data (111) for providing loyalty programs according to one embodiment. In FIG. 8, data related to a third party loyalty program may include an identifier of the loyalty benefit offeror (183) that is linked to a set of loyalty program rules (185) and the loyalty record (187) for the loyalty program activities of the account identifier (181). In one embodiment, at least part of the data related to the third party loyalty program is stored under the account identifier (181) of the user (101), such as the loyalty record (187).

FIG. 8 illustrates the data related to one third party loyalty program of a loyalty benefit offeror (183). In one embodiment, the account identifier (181) may be linked to multiple loyalty benefit offerors (e.g., 183), corresponding to different third party loyalty programs.

In one embodiment, a third party loyalty program of the loyalty benefit offeror (183) provides the user (101), identified by the account identifier (181), with benefits, such as discounts, rewards, incentives, cash back, gifts, coupons, and/or privileges.

In one embodiment, the association between the account identifier (181) and the loyalty benefit offeror (183) in the account data (111) indicates that the user (101) having the account identifier (181) is a member of the loyalty program. Thus, the user (101) may use the account identifier (181) to access privileges afforded to the members of the loyalty program, such as rights to access a member only area, facility, store, product or service, discounts extended only to members, or opportunities to participate in certain events, buy certain items, or receive certain services reserved for members.

In one embodiment, the transaction handler (103) is configured to provide offers from merchants to the user (101) via the payment system, making accessing and redeeming the offers convenient for the user (101). The offers may be triggered by and/or tailored to a previous transaction, and may be valid only for a limited period of time starting from the date of the previous transaction. If the transaction handler (103) determines that a subsequent transaction processed by the transaction handler (103) meets the conditions for the redemption of an offer, the transaction handler (103) may credit the consumer account (146) for the redemption of the offer and/or provide a notification message to the user (101). Further details and examples of one embodiment are provided in U.S. Pat. App. Pub. No. 2010/0114686, entitled "Real-Time Statement Credits and Notifications," the disclosure of which is hereby incorporated herein by reference.

Details on loyalty programs in one embodiment are provided in U.S. Pat. App. Pub. No. 2011/0087530, entitled "Systems and Methods to Provide Loyalty Programs," the disclosure of which is hereby incorporated herein by reference.

SKU

In one embodiment, merchants generate stock-keeping unit (SKU) or other specific information that identifies the particular goods and services purchased by the user (101) or customer. The SKU information may be provided to the operator of the transaction handler (103) that processed the purchases. The operator of the transaction handler (103) may store the SKU information as part of transaction data (109), and reflect the SKU information for a particular transaction in a transaction profile (127 or 131) associated with the person involved in the transaction.

When a user (101) shops at a traditional retail store or browses a website of an online merchant, an SKU-level profile associated specifically with the user (101) may be provided to select an advertisement appropriately targeted to the user (101) (e.g., via mobile phones, POS terminals, web browsers, etc.). The SKU-level profile for the user (101) may include an identification of the goods and services historically purchased by the user (101). In addition, the SKU-level profile for the user (101) may identify goods and services that the user (101) may purchase in the future. The identification may be based on historical purchases reflected in SKU-level profiles of other individuals or groups that are determined to be similar to the user (101). Accordingly, the return on investment for advertisers and merchants can be greatly improved.

In one embodiment, the user specific profile (131) is an aggregated spending profile (341) that is generated using the SKU-level information. For example, in one embodiment, the factor values (344) correspond to factor definitions (331) that are generated based on aggregating spending in different categories of products and/or services. A typical merchant offers products and/or services in many different categories.

Details on SKU-level profile in one embodiment are provided in U.S. Pat. App. Pat. App. Pub. No. 2011/0093335, entitled "Systems and Methods for Advertising Services Based on an SKU-Level Profile," the disclosure of which is hereby incorporated herein by reference.

Real-Time Messages

In one embodiment, the transaction handler (103) is configured to cooperate with the media controller (115) to facilitate real-time interaction with the user (101) when the payment of the user (101) is being processed by the transaction handler (103). The real-time interaction provides the opportunity to impact the user experience during the purchase (e.g., at the time of card swipe), through delivering messages in real-time to a point of interaction (107), such as a mobile phone, a personal digital assistant, a portable computer, etc. The real-time message can be delivered via short message service (SMS), email, instant messaging, or other communications protocols.

In one embodiment, the real-time message is provided without requiring modifications to existing systems used by the merchants and/or issuers.

Figure 9:
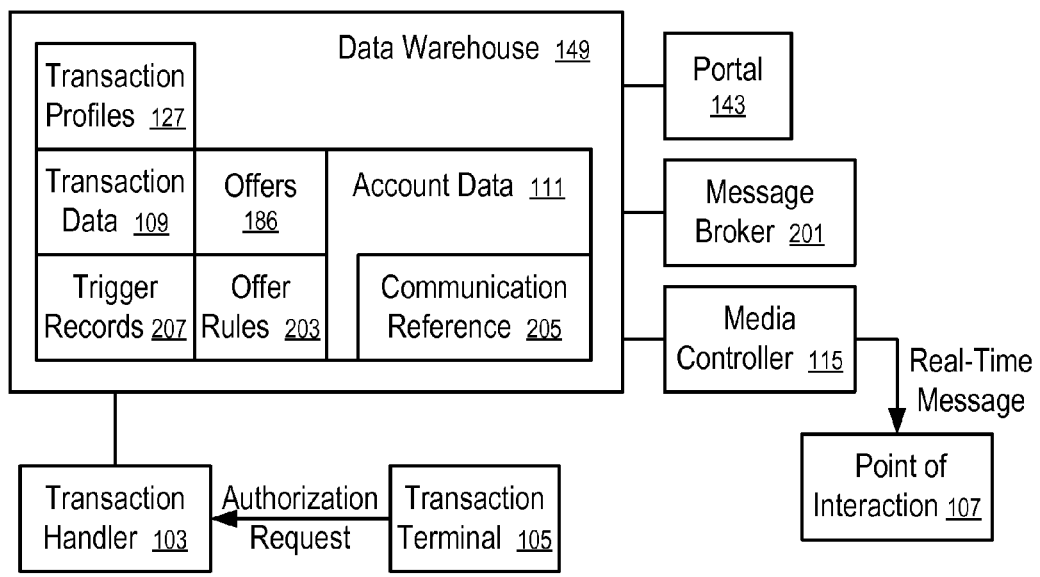
FIG. 9 shows a system to provide real-time messages according to one embodiment.

FIG. 9 shows a system to provide real-time messages according to one embodiment. In FIG. 9, the transaction handler (103) (or a separate computing system coupled with the transaction handler (103)) is to detect the occurrence of certain transactions of interest during the processing of the authorization requests received from the transaction terminal (105); a message broker (201) is to identify a relevant message for the user (101) associated with the corresponding authorization request; and the media controller (115) is to provide the message to the user (101) at the point of interaction (107) via a communication channel separate from the channel used by the transaction handler (103) to respond to the corresponding authorization request submitted from the transaction terminal (105).

In one embodiment, the media controller (115) is to provide the message to the point of interaction (107) in parallel with the transaction handler (103) providing the response to the authorization request.

In one embodiment, the point of interaction (107) receives the message from the media controller (115) in real-time with the transaction handler (103) processing the authorization request. In one embodiment, the message is to arrive at the point of interaction (107) in the context of the response provided from the transaction handler (103) to the transaction terminal (105). For example, the message is to arrive at the point of interaction (107) substantially at the same time as the response to the authorization request arrives at the transaction terminal (105), or with a delay not long enough to cause the user (101) to have the impression that the message is in response to an action other than the payment transaction. For example, the message is to arrive at the point of interaction (107) prior to the user (101) completing the transaction and leaving the transaction terminal (105), or prior to the user (101) leaving the retail location of the merchant operating the transaction terminal (105).

In FIG. 9, the system includes a portal (143) to provide services to merchants and/or the user (101).

For example, in one embodiment, the portal (143) allows the user (101) to register the communication reference (205) in association with the account data (111), such as the account information (142) of the consumer account (146); and the media controller (115) is to use the communication reference (205) to deliver the message to the point of interaction (107). Examples of the communication reference (205) include a mobile phone number, an email address, a user identifier of an instant messaging system, an IP address, etc.

In one embodiment, the portal (143) allows merchants and/or other parties to define rules (203) to provide offers (186) as real-time responses to authorization requests; and based on the offer rules (203), the message broker (201) is to generate, or instruct the media controller (115) to generate, the real-time message to provide the offers (186) to the user (101). For example, the offer (186) may include a discount, incentive, reward, rebate, gift, or other benefit, which can be redeemed upon the satisfaction of certain conditions required by the offer rules (203). In one embodiment, based on the offer rules (203) the message broker (201) configures a message by selecting the appropriate message template from (an) existing message(s) template(s), and inserts any relevant data (e.g., the communication reference (205)) into the selected template, then passes the configured message to the media controller (115), which delivers the message to the point of interaction (107). In one embodiment, the message broker (201) (or a subsystem) is used to manage message templates along with the rules for selecting the appropriate message template from among several potential choices.

In one embodiment, the offer rules (203) include offer details, targeting rules, advertisement campaign details, profile mapping, creative mapping, qualification rules, award/notify/fulfillment rules, approvals, etc. Creative elements for offers include text, images, channels, approvals, etc.

In one embodiment, when the offer rules (203) are activated by the merchant or advertiser via the portal (143), the message broker (201) is to generate trigger records (207) for the transaction handler (103). The transaction handler (103) is to monitor the incoming authorization requests to identify requests that satisfy the conditions specified in the trigger records (207) during the process of the authorization requests, and to provide the information about the identified requests to the message broker (201) for the transmission of an appropriate real-time message in accordance with the offer rules (203).

In one embodiment, the generation of the trigger records (207) for the transaction handler (103) is in real-time with the merchant or advertiser activating the offer rules (203). Thus, the offer rules (203) can be activated and used for the detection of the new authorization requests in real-time, while the transaction handler (103) continues to process the incoming authorization requests.

In one embodiment, the portal (143) provides information about the spending behaviors reflected in the transaction data (109) to assist the merchants or advertisers to target offers or advertisements. For example, in one embodiment, the portal (143) allows merchants to target the offers (186) based on transaction profiles (127). For example, the offer rules (203) are partially based on the values in a transaction profile (127), such as an aggregated spending profile (341). In one embodiment, the offer rules (203) are partially based on the information about the last purchase of the user (101) from the merchant operating the transaction terminal (105) (or another merchant), and/or the information about the location of the user (101), such as the location determined based on the location of the transaction terminal (105) and/or the location of the merchant operating the transaction terminal (105).

In one embodiment, the portal (143) provides transaction based statistics, such as merchant benchmarking statistics, industry/market segmentation, etc., to assist merchants and advertisers to identify customers.

Thus, the real-time messages can be used to influence customer behaviors while the customers are in the purchase mode.

In one embodiment, the benefit of the offers (186) can be redeemed via the transaction handler (103). The redemption of the offer (186) may or may not require the purchase details (e.g., SKU level purchase details). Details in one embodiment about redeeming offers (186) via the transaction handler (103) are provided in U.S. Pat. App. Pub. No. 2011/0288918, entitled "Systems and Methods for Redemption of Offers," the disclosure of which is hereby incorporated herein by reference.

In one embodiment, when the authorization request for a purchase indicates that the purchase qualifies the offer (186) for redemption if the purchase corresponding to the authorization request is completed, the message broker (201) is to construct a message and use the media controller (115) to deliver the message in real-time with the processing of the authorization request to the point of interaction (107). The message informs the user (101) that when the purchase is completed, the transaction handler (103) and/or the issuer processor (145) is to provide the benefit of the offer (186) to the user (101) via statement credit or some other settlement value, for example points in a registered loyalty program, or credit at the point of sale using a digital coupon delivered to the purchaser via mobile phone.

In one embodiment, the settlement of the payment transaction corresponding to the authorization request does not occur in real-time with the processing of the authorization request. For example, the merchant may submit the complete purchases for settlement at the end of the day, or in accordance with a predetermined schedule. The settlement may occur one or more days after the processing of the authorization request.

In one embodiment, when transactions are settled, the settled transactions are matched to the authorization requests to identify offers (186) that are redeemable in view of the settlement. When the offer (186) is confirmed to be redeemable based on a record of successful settlement, the message broker (201) is to use the media controller (115) to provide a message to the point of interaction (107) of the user (101), such as the mobile phone of the user (101). In one embodiment, the message is to inform the user (101) of the benefit to be provided as statement credits and/or to provide additional offers. In one embodiment, the message to confirm the statement credits is transmitted in real-time with the completion of the transaction settlement.

In one embodiment, the message broker (201) is to determine the identity of the merchant based on the information included in the authorization request transmitted from the transaction terminal (105) to the transaction handler (103). In one embodiment, the identity of the merchant is normalized to allow the application of the offer rules (203) that are merchant specific.

In one embodiment, the portal (143) is to provide data insight to merchants and/or advertisers. For example, the portal (143) can provide the transaction profile (127) of the user (101), audience segmentation information, etc.

In one embodiment, the portal (143) is to allow the merchants and/or advertisers to define and manage offers (186) for their creation, fulfillment and/or delivery in messages.

In one embodiment, the portal (143) allows the merchants and/or advertisers to test, run and/or monitor the offers (186) for their creation, fulfillment and/or delivery in messages.

In one embodiment, the portal (143) is to provide reports and analytics regarding the offers (186).

In one embodiment, the portal (143) provides operation facilities, such as onboarding, contact management, certification, file management, workflow assistance, etc. to assist the merchants and/or advertisers to complete the tasks related to the offers (186).

In one embodiment, the portal (143) allows the user (101) to opt in or opt out of the real-time message delivery service.

In one embodiment, an advertiser or merchant can select an offer fulfillment method from a list of options, such as statement credits, points, gift cards, e-certificates, third party fulfillment, etc.

In one embodiment, the merchant or advertiser is to use the "off the rack" transaction profiles (127) available in the data warehouse (149). In one embodiment, the merchant or advertiser can further edit parameters to customize the generation of the transaction profiles (127) and/or develop custom transaction profiles from scratch using the portal (143).

In one embodiment, the portal (143) provides a visualization tool to allow the user to see clusters of data based on GeoCodes, proximity, transaction volumes, spending patterns, zip codes, customers, stores, etc.

In one embodiment, the portal (143) allows the merchant or advertiser to define cells for targeting the customers in the cells based on date/time, profile attributes, map to offer/channel/creative, condition testing, etc.

In one embodiment, the portal (143) allows the merchant or advertiser to monitor the system health, such as the condition of servers, files received or sent, errors, status, etc., the throughput by date or range, by program, by campaign, or by global view, and aspects of current programs/offers/campaigns, such as offer details, package audit reports, etc. In one embodiment, reporting includes analytics and metrics, such as lift, conversion, category differentials (e.g., spending patterns, transaction volumes, peer groups), and reporting by program, campaign, cell, GeoCode, proximity, ad-hoc, auditing, etc.

Figure 10:
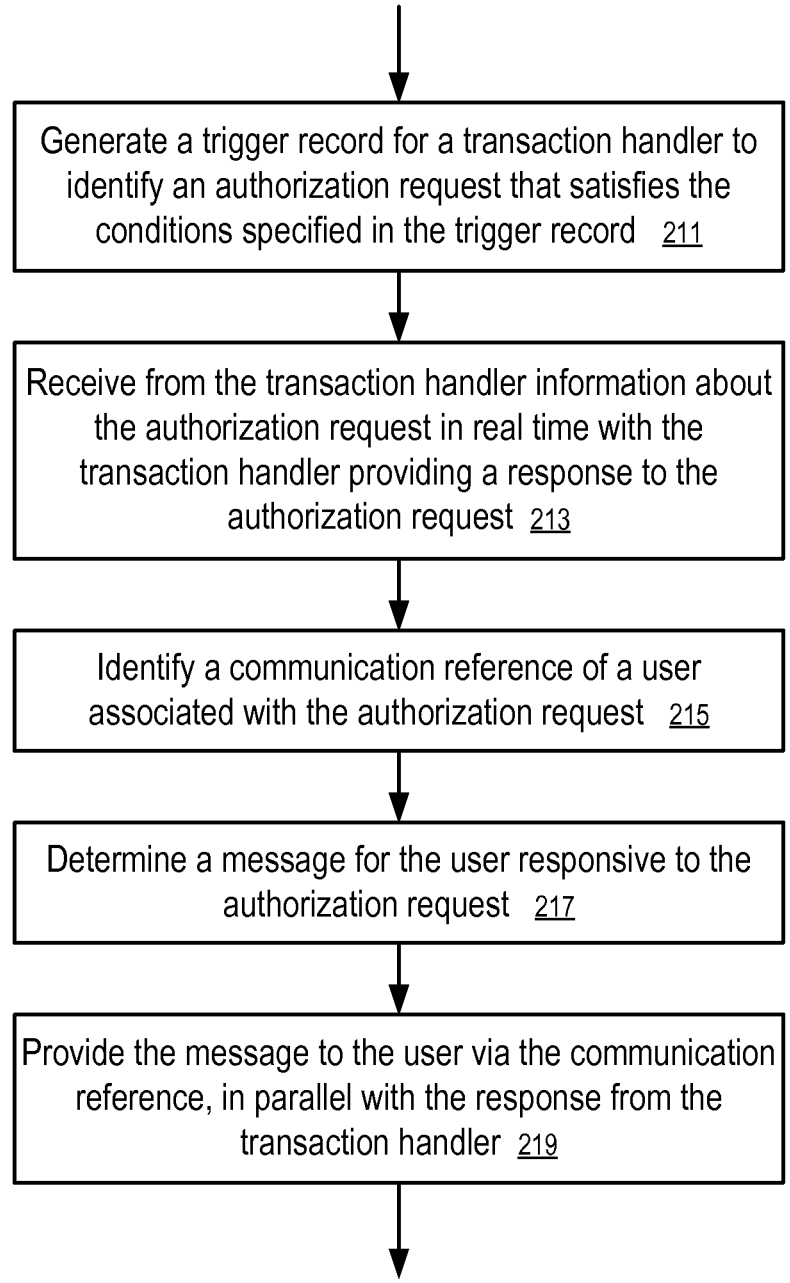
FIG. 10 shows a method to provide real-time messages according to one embodiment.

FIG. 10 shows a method to provide real-time messages according to one embodiment. In FIG. 10, a computing apparatus is to generate (211) a trigger record (207) for a transaction handler (103) to identify an authorization request that satisfies the conditions specified in the trigger record (207), receive (213) from the transaction handler (103) information about the authorization request in real-time with the transaction handler (103) providing a response to the authorization request to a transaction terminal (105), identify (215) a communication reference (205) of a user (101) associated with the authorization request, determine (217) a message for the user (101) responsive to the authorization request, and provide (219) the message to the user (101) at a point of interaction (107) via the communication reference (205), in parallel with the response from the transaction handler (103) to the transaction terminal (105).

In one embodiment, the computing apparatus includes at least one of: a transaction handler (103), a message broker (201), a media controller (115), a portal (143) and a data warehouse (149).

Merchant Aggregator

In one embodiment, real-time information about transactions is communicated to a remote computing device, such as a merchant aggregator, which has a plurality of merchants as clients. The computing device is connected to the portal (143) of the transaction handler (103) a communication network (e.g., Internet, a wide area network, or a dedicate network) to receive the real-time information and provide services to the merchants and their customers.

In one embodiment, the remote computing device, such as the merchant aggregator, is configured to provide offers (186) to customers (e.g., user (101)) on behalf of the merchants, service loyalty programs on behalf of the merchants, and/or provide rewards to customers (e.g., user (101)) for their interaction with the merchants, etc. The real-time information about the transactions between the merchants and the customers allows the remote computing device to provide new services and improve existing services.

In one embodiment, the computing device remotely connected to the portal (143), such as a merchant aggregator, is configured to enroll merchants and/or customers (e.g., user (101)) to provide services based on the real-time information about transactions between the merchants and the customers (e.g., user (101)). However, the identifiers used by the portal (143) to identify the enrolled merchants are generally different from merchant identifies used by the transaction handler (103) in processing transactions initiated using the transaction terminals (e.g., 105) of the merchants. Thus, the identifiers used by the portal (143) to identify the enrolled merchants may not be sufficient to identify the transactions between the enrolled merchants and the enrolled customers.

In one embodiment, the portal (143) of the transaction handler (103) is configured to match the identities of the merchants as known to the remote computing device, such as the merchant aggregator, with the identities of the merchants as known to the transaction handler (103), to facilitate the monitoring of transactions of the merchants and to generate the real-time information about the transactions between the respective merchants and enrolled customers (e.g., user (101)).

In one embodiment, the portal (143) is configured to link a merchant identifier of a merchant as known to the remote computing device to a merchant identifier of the merchant as known to the transaction handler (103) via a transaction made using a transaction terminal (105) of the merchant. Information about the transaction is communicated between the portal (143) and the remote computing device, in association with the merchant identifier of the merchant as known to the remote computing device, to identify the transaction from the transactions processed the transaction handler (103) and thus link the merchant identifier of the merchant as known to the remote computing device, to the merchant identifier used in the identified transaction.

Alternatively or in combination, the portal (143) is configured to link the merchant identifier of the merchant as known to the remote computing device to the merchant identifier of the merchant as known to the transaction handler (103) based at least in part on marching attributes of the merchant, such as name, address, business category, etc.

For example, when a merchant enrolls or registers with the remote computing device to receive the services of the remote computing device, the remote computing device is configured to collect information about the merchant, such as the business name of the merchant, the street address of the merchant, the business category of the merchant, etc. Such information about the merchant can be matched with the respective merchant information in the data warehouse stored for the merchants as known to the transaction handler (103). Different data fields, such as name, address, business field, may provide partial match for a given merchant identifier of the merchant as known to the remote computing device; and a rule engine is configured in one embodiment to rank the degree of match and select one or more top ranked candidate merchant identifiers, as used in transactions processed by the transaction handler (103).

In one embodiment, a transaction is initiated on a transaction terminal (105) of a merchant as part of the process to register or enroll the merchant for the services of the remote computing device. The transaction is identified as part of information about the merchant, in association with the merchant identifier of the merchant as known to the remote computing device. The merchant identifier used in the transaction is thus linked to the merchant identifier of the merchant as known to the remote computing device. Thus, transactions of the merchant can be monitored using the merchant identifier used in the transaction formed as part of the process to register or enroll the merchant.

In one embodiment, the transaction formed as part of the process to register or enroll the merchant is performed in a predetermined account. The information about the transaction is provided to the portal (143) to allow the portal (143) to identify a transaction record for the transaction, based on attributes such as the date and/or time of the transaction, the transaction amount, an authorization code for the transaction, and a message (e.g., a pseudo-promotional code) transmitted to the transaction handler (103) in an authorization request for the transaction, etc. The portal (143) is configured to identify the transaction record (e.g., 301) of the transaction based on matching the attributes as identified in the information transmitted from the remote computing device to the portal (143).

In one embodiment, the portal (143) is configured to communicate with the remote computing device to determine one or more parameters of the transaction performed on the transaction terminal (105) of a merchant to enroll or register the merchant. Examples of the parameters that can be configured to uniquely identify merchants to be enrolled include transaction amounts, pseudo-promotional code, etc. After one or more parameters are determined to uniquely identify the merchant among a set of merchants currently in the process of being enrolled or registered, the transaction terminal (105) is used to initiate the transaction according to the one or more parameters; and the transaction handler (103) is configured to monitor transactions being processed to detect the transaction initiate the transaction according to the one or more parameters. In response to the detection of authorization request initiated on the transaction terminal (105) of the merchant for the transaction made according to the one or more parameters, the merchant identifier used in the authorization request is extracted and linked to the merchant as registered and/or enrolled.

In one embodiment, enrollment communication between the portal (143) and the remote computing device includes not only the identification information about the merchant, but also the identification information of the transaction terminal (105) used to initiate the transaction designed to register the merchant and/or the transaction terminal (105). In one embodiment, information about the transaction terminal (105) includes an identifier of the transaction terminal (105) (e.g., a serial number), a location of the transaction terminal (105) (e.g., a street address of a retail store in which the transaction terminal (105) is deployed, a GPS position of the transaction terminal (105), a description of the location of the transaction terminal (105) within a retail store in which a plurality of transaction terminals (e.g., 105) of the merchant are located).

In one embodiment, multiple transactions are performed to individually identify the transaction terminals of the merchant. Thus, the transaction handler (103) can monitor the transactions made using specific transaction terminals of the merchant and/or provide information about the transaction terminals on which the monitored transactions are initiated.

In one embodiment, when an authorization request for a transaction made using the one or more parameters assigned to uniquely identify the merchant and/or the transaction terminal (105) of the merchant is detected, the transaction handler (103) is configured to communicate with the portal (143) to provide a response to indicate the detection of the transaction. For example, in one embodiment, the transaction handler (103) is configured to provide an indication via the authorization response to indicate the recognition of the merchant and/or the transaction terminal (105). For example, in one embodiment, the portal (143) is configured to provide a message to the remote computing device to indicate the successful detection of transaction associated with the merchant and/or the transaction terminal (105) and completion of the registration or enrollment process.

Figure 11:
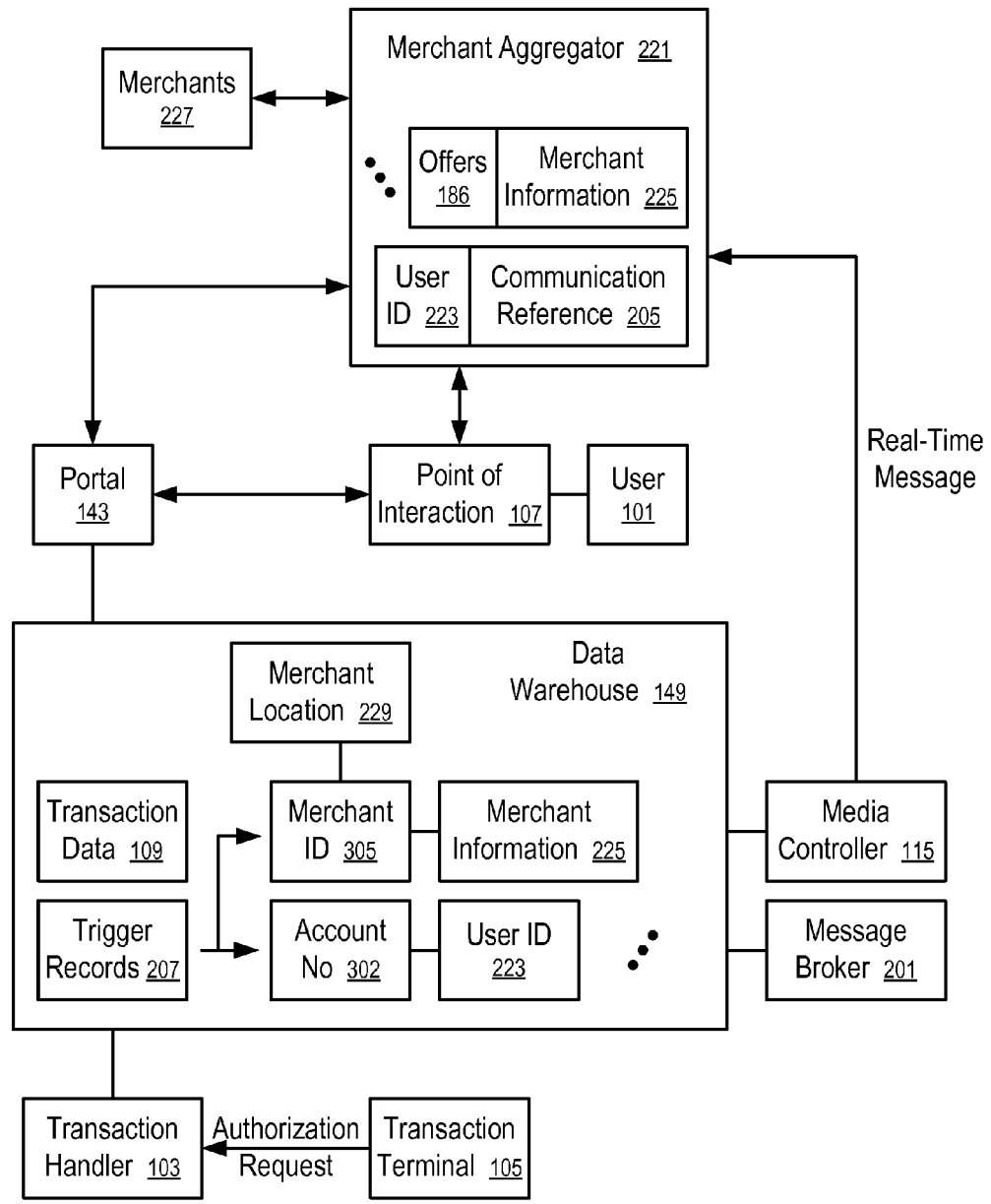
FIG. 11 shows a system configured to communicate via a merchant aggregator according to one embodiment.

FIG. 11 shows a system configured to communicate via a merchant aggregator according to one embodiment. In FIG. 11, the merchant aggregator (221) is configured to communicate with merchants (227) to enroll the merchants (227) for the services of the system.

In one embodiment, when the merchant aggregator (221) enrolls a new merchant, the merchant aggregator provides merchant information (225) to the portal (143) of the transaction handler (103) to request the portal (143) and/or the transaction handler (103) to monitor the transactions of the respective merchant (227).

In one embodiment, the merchant information (225) used by the merchant aggregator (221) to identify the merchant (227) may include the business data (e.g., corporation data, corporation name, consumer-facing name, "doing business as" names, names of affiliates and/or subsidiaries), addresses and store locations, etc. of the merchant (227). In one embodiment, the merchant information (225) further includes information about the acquirer representing the merchant, merchant category, and/or other relevant information that is helpful in identifying the merchant in the transaction processing network having the transaction handler (103) interconnecting acquirer processors (e.g., 147) operated by acquirers representing respective merchants and issuer processors (e.g., 145) operated by issuers representing respective users (101) of consumer accounts (146).

For example, in one embodiment, the merchant aggregator (221) provides the merchant information (225) via a spreadsheet identifying a list of merchants (227). In the spreadsheet, each merchant (227) is identified via the corporate name of the merchant (227) and the consumer-facing name of the merchant. For less well known merchants (e.g., small businesses), the spreadsheet further identifies the name of the acquiring bank that represents the merchant (227) in processing transactions to be processed via the transaction handler (103). In one embodiment, the spreadsheet further includes the desired starting date of monitoring the transactions of the merchants (227) identified in the spreadsheet and the expected ending date of monitoring the transactions of the merchant (227) for the merchant aggregator (221).

In one embodiment, the portal (143) is configured to provide a user interface that allows the merchant aggregator (221) to specify data for the creation of the trigger records (207) associated with an offer campaign. For example, the user interface in one embodiment allows the merchant aggregator (221) to create an offer campaign associated with one of the merchants (227) identified in the spreadsheet provided to identify the merchants (227). To support the offer campaign, the user interface is configured to allow the merchant aggregator (221) to specify rules to monitor the transactions of the respect merchant (227). For example, the rules may identify a date to start testing of the monitoring of the transactions of the merchant (227), a date to send the monitoring of the transactions of the merchant (227) for the purpose of the offer campaign, a request for a notification of transactions provided in real time as the processing of the authorization requests of the respective transactions of the merchant (227), and/or a request for a notification of transactions provided in real time as the processing of the settlement requests of the respective transactions of the merchant (227). In one embodiment, the user interface further allows the merchant aggregator (221) to specify other requirements to select transactions to be monitored, such as requirements based on transaction amount, transaction time, characteristics of the user (101) purchasing from the merchant (227), etc. In one embodiment, the user interface further allows the merchant aggregator (221) to specify messages to be transmitted, in a way as illustrated in FIG. 9, to the respective user (101) transacting with the merchant (227), in response to the transactions detected according to the offer rules.

In one embodiment, the portal (143) is configured to correctly identify transactions associated with the enrolled merchant (227) based on the merchant information (225), and calculate the location of the transactions to enable location based services associated with the offer (186) of the merchant (227).

In one embodiment, based on the merchant information (225), the portal (143) is configured to identify one or more merchant IDs (305) that are configured to be used in authorization requests for transactions of the merchant (227) identified by the merchant information (225). The identified merchant ID (305) is used to generate the trigger records (207) for monitoring the transactions of the merchant (227) identified by the merchant information (225) provided by the merchant aggregator (221).

In one embodiment, the account holders (e.g., user (101)) are required to enroll with the system to provide the consent for the media controller (115) to send the transaction information of the account holders (e.g., user (101)) to the merchant aggregator (221), and for the media controller (115) and/or the merchant aggregator (221) to send messages to the point of interaction (107) of the user (101) based on the transaction information.

In FIG. 11, after user enrollment, the user (101) of the consumer account (146) is identified to be associated with a user ID (223) used by the merchant aggregator (221) to identify the user (101). The user (101) may further provide the communication reference (205) to the merchant aggregator (221) to receive offers (186), rewards, notifications, alerts, etc. The transaction handler (103) is configured to use the trigger records (207) containing the account number (302) of the user (101) to detect the transactions of the user (101) (e.g., the transactions between the user (101) between one or more the enrolled merchants (e.g., 227)).

To associate the account number (302) with the user ID (223) in one embodiment, the account number (302) of the consumer account (146) of the user (101) is identified to the portal (143) during the user enrollment and stored in the data warehouse (149) in association with the user ID (223).

For example, during the user enrollment process, the point of interaction (107) (e.g., a web browser, a mobile phone) of the user (101) interacting with the merchant aggregator (221) is redirected in one embodiment from the merchant aggregator (221) to the portal (143) with a reference to the user ID (223); and in response, the portal (143) provides a user interface to the point of interaction (107) of the user (101) to specify the account number (302). After the account number (302) specified by the user (101) is validated and/or authenticated (e.g., via security code, person identification number, security questions, security devices, etc.), the account number (302) is associated with the user ID (223) in the data warehouse (149) of the transaction handler (103).

In one embodiment, more than one account number (302) of the consumer accounts (146) of the user (101) can be associated with the single user ID (223) used by the merchant aggregator (221) to represent the user (101).

In one embodiment, the user ID (223) is assigned to the user (101) by the merchant aggregator (221) during the enrollment process. Alternatively, the portal (143) may generate and assign the user ID (223) for the user during the enrollment process and provide the user ID (223) to the merchant aggregator (221) to complete the enrollment of the user (101).

In one embodiment, during the enrollment process, the user (101) provides the account number (302) to the merchant aggregator (221), which indicates the association between the account number (302) and the user ID (223) to the portal (143) of the transaction handler (103); and the user ID (223) is subsequently used to identify the user (101) is messages to the merchant aggregator (221). Alternatively, the account number (302) may be used directly to identify the user (101), when the real-time message from the media controller (115) to the merchant aggregator (221) is transmitted over a secure communication channel.

In one embodiment, the trigger record (207) is generated based at least in part on the account number (302) and the merchant ID (305) to monitor the transactions between the user (101) and the merchant (227). When the authorization request from the transaction terminal (105) of the merchant (227) identifies the account number (302) and the merchant ID (305), as required by the trigger record (207) (and satisfies other requirements of the trigger record (207), such as requirements related to the date and time of the transaction, the amount of the transaction, etc.), the transaction handler (103) causes the message broker (201) to generate a message and transmit the message to the merchant aggregator (221), in real time with the processing of the transaction, to inform the merchant aggregator (221) of the transaction.

In one embodiment, the data warehouse (149) stores the merchant location (229) for the merchant ID (305) associated with the transaction terminal (105).

In one embodiment, in response to the authorization request from the transaction terminal (105), the merchant location (229) of the transaction terminal (105) is determined and included in the real-time message generated by the message broker (201) and provided to the merchant aggregator (221) in a generic, machine-readable format (e.g., XML). Based on the information provided in the real-time message, the merchant aggregator (221) may use the communication reference (205) to communicate offers (186), rewards, messages, notifications, alerts, etc. to the point of interaction (107) of the user (101), such as via messages to a mobile phone identified by the communication reference (205) and/or a mobile application running on the mobile phone of the user (101).

In FIG. 11, the merchant aggregator (221) is configured to communicate with the point of interaction (107) of the user (101) in response to the real-time message from the media controller (115). Alternatively or in combination, the data warehouse (149) may store the communication reference (205), which is used by the media controller (115) to provide one or more separate real-time messages related to location-based offers (186) to the point of interaction (107) of the user (101) without going through the merchant aggregator (221).

In one embodiment, a merchant (227) may have a number of subsidiaries with different names and locations. In response to the merchant information (225), merchant data related to merchant accounts (148) are searched to identify a set of possible matches to the merchant information (225), which may be further communicated to the merchant aggregator (221) for confirmation. For example, in one embodiment, each matched merchant ID is augmented with the respective address of the transaction terminals operated by the respective merchant entity; and the merchant (227) may further confirm the enrollment of the respective merchant entity. In one embodiment, the names and addresses of the merchant information (225) are matched with the names and addresses of the merchant data for merchant accounts (148) to identify the merchant entity that is enrolled via the merchant information (225).

In one embodiment, a plurality of merchant IDs (305) may match the merchant information (225) specified by the merchant aggregator (221); and one or more merchant locations corresponding to the locations of the transaction terminals (105) may associate with a merchant ID (305) in the data warehouse (149). When the trigger record (207) matches a transaction, the merchant location (229) corresponding to the transaction terminal (105) from which the authorization request is received is used for the location-based service provided by the merchant aggregator (221) and/or the message broker (201).

Figure 12:
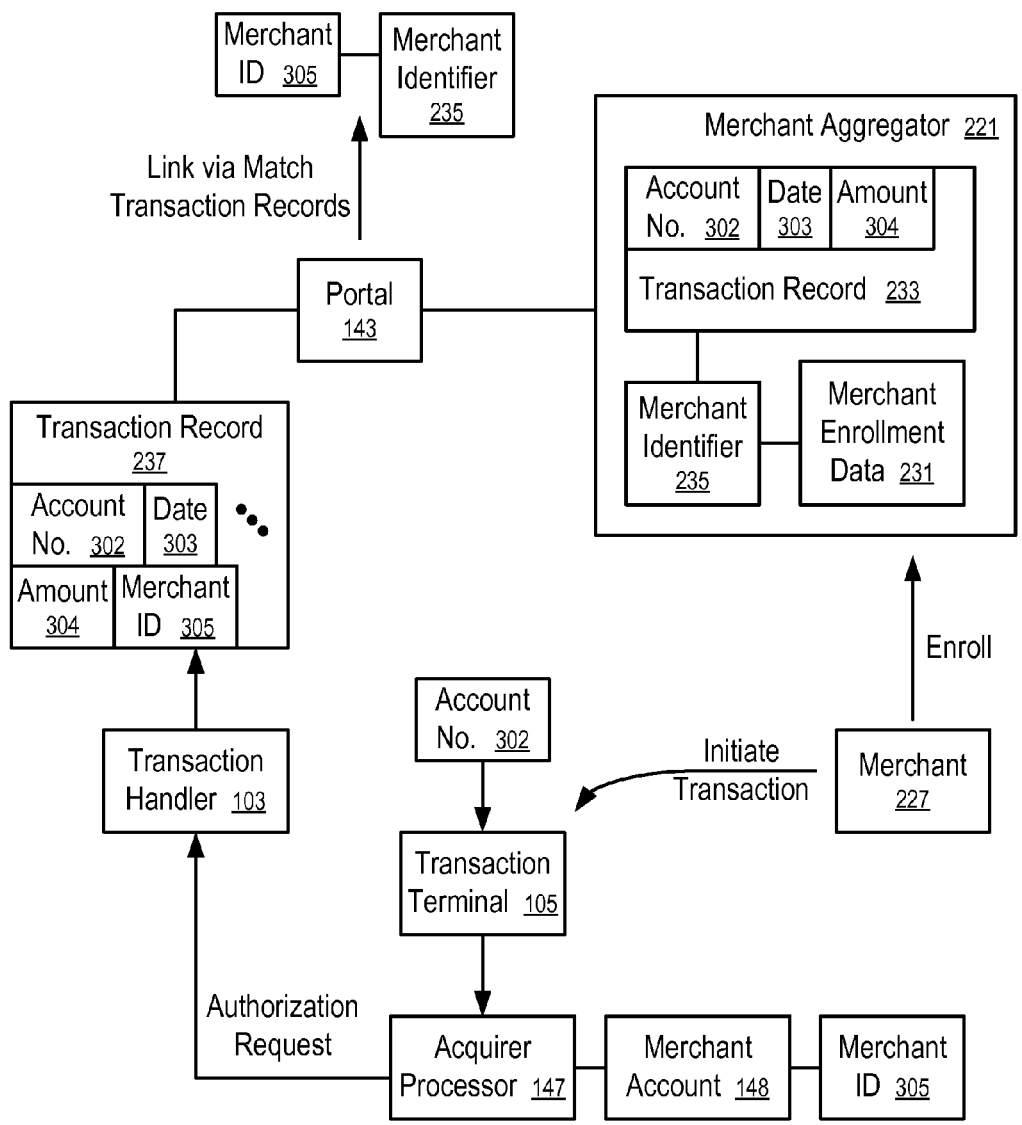
FIG. 12 shows a system to enroll a merchant according to one embodiment.

FIG. 12 shows a system to enroll a merchant according to one embodiment. In FIG. 12, a transaction made using a predetermined account number (302) is used to correlate the merchant information (225) (e.g., a merchant identifier (235)

of the merchant as known to the merchant aggregator (221)) with the merchant ID (305) used in the transaction messages processed by the transaction handler (103).

In FIG. 12, when the merchant (227) enrolls with the merchant aggregator (221), the merchant enrollment data (231), including the merchant information (225), is generated to identify the names and locations of the enrolled merchant (227). The merchant aggregator (221) uses the merchant identifier (235) to represent the enrolled merchant (227).

In one embodiment, to correlate the merchant identifier (235) with a merchant ID (305) associated with the merchant account (148), the transaction terminal (105) at the enrolled location of the merchant (227) is used to initiate a transaction using a predetermined account number (302). After the transaction is initiated, the acquirer processor (147) connected to the transaction terminal (105) provides the authorization request to the transaction handler (103), which stores the transaction record (237) that includes the predetermined account number (302), the merchant ID (305), the date (303) of the transaction, the amount (304) of the transaction, the authorization code provided by the transaction handler (103), through the acquirer processor (147), to the transaction terminal (105) for the transaction, etc.

In one embodiment, the merchant aggregator (221) stores a separate transaction record (233) including certain information about the transaction as identified by the enrolling merchant (227), such as the predetermined account number (302), the date (303) (or the time period in which transaction is performed), the amount (304), and the authorization code received by the transaction terminal (105), through the acquirer processor (147) and the transaction handler (103), for the transaction, etc.

In FIG. 12, the portal (143) is configured to match the transaction records (233 and 237) to link the merchant ID (305) to the merchant identifier (235), using one or more sets of corresponding fields of the transaction records (233 and 237).

For example, during the enrollment period, the portal (143) is configured to retrieve transactions records (237) for the predetermined account number (302) from the data warehouse (149); and the merchant aggregator (221) is configured to provide its transaction record (233) with the merchant identifier (235) to the portal (143). The portal (143) is configured to match the transaction records (233 and 237) based on the account number (302), the transaction date (303), and/or the transaction amount (304). When a match is detected, the merchant ID (305) (and the identifier of the transaction terminal (105)) from the transaction record (237) generated by the transaction handler (103) is linked to the merchant identifier (235) associated with the transaction record (233) stored by the merchant aggregator (221).

Using the system of FIG. 12, the merchant (227) can selectively enroll certain transaction terminals (105) operated under certain names and/or at certain locations. Thus, the merchant (227) may enroll a portion of the transaction terminals (105) under the control of the merchant (227) but not another portion of the transaction terminals (105) under the control of the merchant (227). Different transaction terminals e.g., 105) of a merchant may have different merchant ID (305) and/or transaction terminal IDs. Through transactions initiated using the different transaction terminals of the merchant, the merchant identifier (235) representing an enrolled merchant is linked to the different merchant ID (305) and/or transaction terminal IDs as used in authorization request for the transactions made using respective transaction terminals of the corresponding enrolled merchant.

In one embodiment, the transaction record (233) further includes the location information of the transaction terminal (105), which can be used for location based services. For example, in reporting the transaction initiated via using the predetermined account number (302) at the transaction terminal (105), the merchant (227) may specify the location of the transaction terminal (105) via a mobile device, a mobile application, a map application, or a street address. Thus, the location of the transaction terminal (105) is associated with the merchant ID (305) and/or the transaction terminal (105).

In one embodiment, the data warehouse (149) stores location information of transaction terminal (105) (e.g., as reported by the acquirer processor (147)) and provides the location information to the merchant aggregator (221) after the merchant ID (305) is linked to the merchant identifier (235) via the transaction record (237) for the transaction initiated on the transaction terminal (105).

In one embodiment, during the enrollment process, the merchant aggregator (221) instructs the merchant (227) to perform the transaction according to the data stored in the transaction record (223) and provides the transaction record (233) to the portal (143). In response, the portal (143) generates a trigger record (207) to detect the transaction that is subsequently initiated by the merchant at the transaction terminal (105). In one embodiment, the trigger record (207) is configured to cause the portal (143) to link the merchant ID (305) from the transaction record (237) of the identified transaction with the merchant identifier (235) associated with the transaction record (233) used to generate the trigger record (207).

In one embodiment, during the enrollment process, the merchant aggregator (221) is configured to request the portal (143) to generate a set of transaction parameters to temporarily identify a transaction terminal (105) of a merchant (227). The portal (143) is configured to transmit the parameters to the merchant aggregator as part of the transaction record (233) for initiation of the transaction. Examples of the parameters include the transaction amount, a pseudo-promotional code to be transmitted in an authorization request initiated in the transaction terminal (105). After the parameters are transmitted to the merchant aggregator (221), the transaction handler (103) is configured to monitor transactions to detect the transaction made, in the predetermined account, using the parameters provided to the merchant aggregator (221). Thus, as soon as the authorization request for the expected transaction reaches the transaction handler (103), the portal (143) can identify the merchant ID (305) and/or the transaction terminal ID of the respective transaction terminal (105) from the received authorization request, for association with the transaction terminal (105) of the merchant (227) to be enrolled.

In one embodiment, the transaction handler (103) is configured to monitor and detect a plurality of transactions initiated to enroll a plurality of different merchants and/or different transaction terminals of the enrolled merchants. To separately identify the merchants and/or the transaction terminals, the portal (143) and/or the merchant aggregator (221) are configured to select the transaction parameters (e.g., transaction amounts) as temporary unique identifiers of the merchants and/or transaction terminals. A data warehouse (e.g., 149) is configured to store data associating the temporary unique identifiers with the merchants and/or transaction terminals. After a transaction is performed and detected, the temporary association between the corresponding transaction parameters with the merchants and/or transaction terminals can be removed and/or reused for the identification of further merchants and/or transaction terminals.

In one embodiment, the transaction parameters configured as temporary identifiers of the enrolled merchants and/or transaction terminals are used to create trigger records to detect the subsequent authorization requests initiated from the corresponding transaction terminals of the enrolled merchants.

Figure 13:
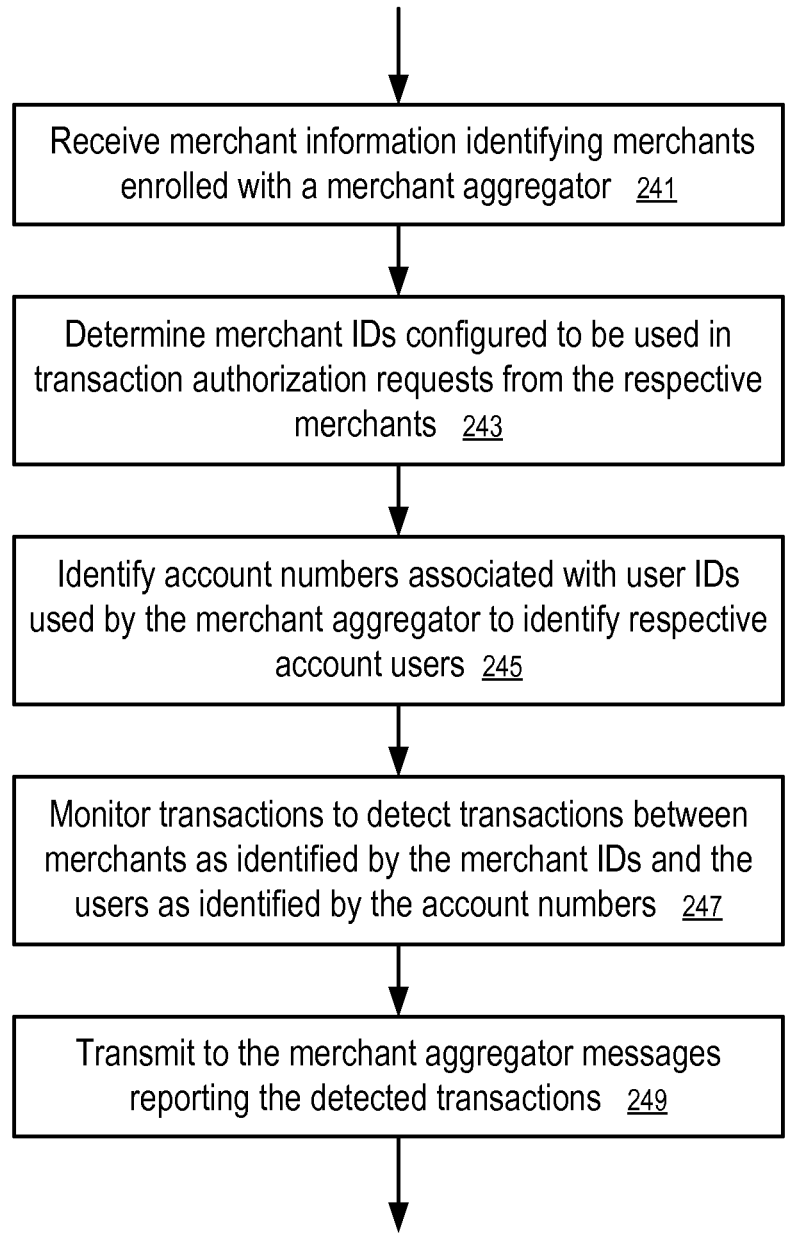
FIG. 13 shows a method to provide real-time notifications of transactions according to one embodiment.

FIG. 13 shows a method to provide real-time notifications of transactions according to one embodiment. In FIG. 13, a computing apparatus is configured to receive (241) merchant information (225) identifying merchants (227) enrolled with a merchant aggregator (221), determine (243) merchant IDs (305) configured to be used in transaction authorization requests from the respective merchants (227), identify (245) account numbers (302) associated with user IDs (223) used by the merchant aggregator (221) to identify respective account users (101), monitor (247) transactions processed by the transactions handler (103) to detect transactions between merchants (227) as identified by the merchant IDs (305) and the users (101) as identified by the account numbers (302), and transmit (249) to the merchant aggregator (221) messages reporting the detected transactions.

In one embodiment, the computing apparatus is configured to: receive first data including a first merchant identifier (235) of a merchant (227); determine, using the first data, a second merchant identifier (305) different from the first merchant identifier and configured to identify the merchant in authorization requests for transactions of the merchant (227) submitted to a transaction handler (103); monitor, using the second merchant identifier (205), transactions of the merchant (227) to detect a subset of the transactions; and in response to detecting a transaction in the subset, transmit a message in real time as the transaction handler (103) processes the transaction, where the message contains information about the transaction and identifies the merchant using the first merchant identifier (235).

In one embodiment, the computing apparatus is configured to store second data associating the first merchant identifier (235) and the second merchant identifier (225), and determine, using the second data, the first merchant identifier (235) for the transaction, after the detecting of the transaction in the subset.

In one embodiment, the message containing information about the detected transaction in the subset is communicated via a communication channel separate from a communication channel used to process authorization of the transaction.

In one embodiment, the message is communicated to a computing device (e.g., merchant aggregator (221)) not involved in authorization of the transaction; and where the computing device (e.g., merchant aggregator (221)) receiving the message is configured to identify the merchant using the first merchant identifier (235), after the merchant (227) is enrolled in a program hosted on the computing device.

In one embodiment, the receiving of the first data identifying the merchant includes: receiving a request associated with the merchant; and computing a transaction amount configured to uniquely identify the merchant among a plurality of merchants in transactions to be made in a predetermined account; and providing the transaction amount as a response to the request. In one embodiment, the request includes the first merchant identifier of the merchant.

In one embodiment, after the providing of the transaction amount as the response to the request, the computing apparatus is configured to: monitor transactions in the predetermined account to detect a first transaction in the predetermined account by matching a transaction amount of the first transaction with the transaction amount provided as a response to the request; and determine the second merchant identifier based on the first transaction, where the first transaction is made in the predetermined account in accordance with the transaction amount that is provided as a response to the request.

In one embodiment, the computing apparatus is configured to store a trigger record for the predetermined account to monitor transactions in the predetermined account in real time as authorization requests for transactions in the predetermined account are processed by the transaction handler.

In one embodiment, the computing apparatus is configured to store third data identifying transaction amounts that have been assigned to represent different merchant identifiers including the first merchant identifier, where each of the transaction amounts uniquely identifies a respective one of the different merchant identifiers of the plurality of merchants; and after the detection of the first transaction, the computing apparatus removes from the third data association between the first merchant identifier and the transaction amount that is provided as a response to the request.

In one embodiment, the computing apparatus is configured to enroll a plurality of account holders to detect the transactions in the subset based at least in part on account numbers of the account holders.

In one embodiment, the determining of the second merchant identifier includes: identifying a transaction record of the first transaction based on matching data contained in the transaction record with the information about the first transaction provided in the first data (e.g., a date of the first transaction, a time of the first transaction, a transaction amount of the first transaction, a location of the merchant); and determining the second merchant identifier based on the transaction record.

In one embodiment, the computing apparatus having at least one processor and memory storing instructions configured to instruct the at least one processor to perform operations. The computing apparatus includes: a portal (143) configured to communicate with a remote computing device (e.g., merchant aggregator (221)) over a communication network to receive first data including a first merchant identifier (235) of the merchant (227); and a transaction handler (103) configured to use a second merchant identifier (305) to identify the merchant in authorization requests for transactions of the merchant (227) submitted from the transaction terminal (105) of the merchant to the transaction handler (103) via the acquirer processor (147) associated with the merchant account (148) of the merchant (227), where the portal (143) is coupled with the transaction handler (103) to determine, using the first data, the second merchant identifier (305) different from the first merchant identifier (235). The computing apparatus further includes a data warehouse (149) configured to store transaction data (109) recording transactions processed by the transaction handler (103) and store second data associating the first merchant identifier (305) and the second merchant identifier (235). The transaction handler (103) is configured via trigger records (207) to monitor, using the second merchant identifier (305), transactions of the merchant (227) to detect the subset of the transactions.

In one embodiment, the computing apparatus further includes a media controller (115) configured to transmit, in response to detecting a transaction in the subset, a message to the remote computing device (e.g., merchant aggregator (221)) in real time as the transaction handler (103) processes the transaction to inform the remote computing device (e.g., merchant aggregator (221)) of the transaction.

In one embodiment, the data warehouse (143) is configured to store third data associating a plurality of suggested transaction amounts with a plurality of different merchant identifiers respectively, where each of the plurality of suggested transaction amounts uniquely identifies a corresponding merchant identifier in the plurality of different merchant identifiers.

In one embodiment, the portal (143) is configured to provide, to the remote computing device in response to the first data, a suggested transaction amount configured to uniquely identify the first merchant identifier in the plurality of different merchant identifiers in the third data. After the portal (143) provides the suggested transaction amount to the remote computing device, the transaction handler is configured to detect an authorization request for the first transaction, made according to the suggested transaction amount, in a predetermined account using a transaction terminal of the merchant, where the second merchant identifier is determined from the authorization request.

In one embodiment, the computing apparatus/system includes at least one of: the portal (143), the data warehouse (149), the transaction handler (103), the medial controller (115), and the message broker (201), each of which may be implemented using a data processing system illustrated in FIG. 7, with more or less components.

Variations

Some embodiments use more or fewer components than those illustrated in FIGS. 1 and 4-7. For example, in one embodiment, the user specific profile (131) is used by a search engine to prioritize search results. In one embodiment, the correlator (117) is to correlate transactions with online activities, such as searching, web browsing, and social networking, instead of or in addition to the user specific advertisement data (119). In one embodiment, the correlator (117) is to correlate transactions and/or spending patterns with news announcements, market changes, events, natural disasters, etc. In one embodiment, the data to be correlated by the correlator with the transaction data (109) may not be personalized via the user specific profile (131) and may not be user specific. In one embodiment, multiple different devices are used at the point of interaction (107) for interaction with the user (101); and some of the devices may not be capable of receiving input from the user (101). In one embodiment, there are transaction terminals (105) to initiate transactions for a plurality of users (101) with a plurality of different merchants. In one embodiment, the account information (142) is provided to the transaction terminal (105) directly (e.g., via phone or Internet) without the use of the account identification device (141).

In one embodiment, at least some of the profile generator (121), correlator (117), profile selector (129), and advertisement selector (133) are controlled by the entity that operates the transaction handler (103). In another embodiment, at least some of the profile generator (121), correlator (117), profile selector (129), and advertisement selector (133) are not controlled by the entity that operates the transaction handler (103).

For example, in one embodiment, the entity operating the transaction handler (103) provides the intelligence (e.g., transaction profiles (127) or the user specific profile (131)) for the selection of the advertisement; and a third party (e.g., a web search engine, a publisher, or a retailer) may present the advertisement in a context outside a transaction involving the transaction handler (103) before the advertisement results in a purchase.

For example, in one embodiment, the customer may interact with the third party at the point of interaction (107); and the entity controlling the transaction handler (103) may allow the third party to query for intelligence information (e.g., transaction profiles (127), or the user specific profile (131)) about the customer using the user data (125), thus informing the third party of the intelligence information for targeting the advertisements, which can be more useful, effective and compelling to the user (101). For example, the entity operating the transaction handler (103) may provide the intelligence information without generating, identifying or selecting advertisements; and the third party receiving the intelligence information may identify, select and/or present advertisements.

Through the use of the transaction data (109), account data (111), correlation results (123), the context at the point of interaction, and/or other data, relevant and compelling messages or advertisements can be selected for the customer at the points of interaction (e.g., 107) for targeted advertising. The messages or advertisements are thus delivered at the optimal time for influencing or reinforcing brand perceptions and revenue-generating behavior. The customers receive the advertisements in the media channels that they like and/or use most frequently.

In one embodiment, the transaction data (109) includes transaction amounts, the identities of the payees (e.g., merchants), and the date and time of the transactions. The identities of the payees can be correlated to the businesses, services, products and/or locations of the payees. For example, the transaction handler (103) maintains a database of merchant data, including the merchant locations, businesses, services, products, etc. Thus, the transaction data (109) can be used to determine the purchase behavior, pattern, preference, tendency, frequency, trend, budget and/or propensity of the customers in relation to various types of businesses, services and/or products and in relation to time.

In one embodiment, the products and/or services purchased by the user (101) are also identified by the information transmitted from the merchants or service providers. Thus, the transaction data (109) may include identification of the individual products and/or services, which allows the profile generator (121) to generate transaction profiles (127) with fine granularity or resolution. In one embodiment, the granularity or resolution may be at a level of distinct products and services that can be purchased (e.g., stock-keeping unit (SKU) level), or category or type of products or services, or vendor of products or services, etc.

The profile generator (121) may consolidate transaction data for a person having multiple accounts to derive intelligence information about the person to generate a profile for the person (e.g., transaction profiles (127), or the user specific profile (131)).

The profile generator (121) may consolidate transaction data for a family having multiple accounts held by family members to derive intelligence information about the family to generate a profile for the family (e.g., transaction profiles (127), or the user specific profile (131)).

Similarly, the profile generator (121) may consolidate transaction data for a group of persons, after the group is identified by certain characteristics, such as gender, income level, geographical location or region, preference, characteristics of past purchases (e.g., merchant categories, purchase types), cluster, propensity, demographics, social networking characteristics (e.g., relationships, preferences, activities on social networking websites), etc. The consolidated transaction data can be used to derive intelligence information about the group to generate a profile for the group (e.g., transaction profiles (127), or the user specific profile (131)).

In one embodiment, the profile generator (121) may consolidate transaction data according to the user data (125) to generate a profile specific to the user data (125).

Since the transaction data (109) are records and history of past purchases, the profile generator (121) can derive intelligence information about a customer using an account, a customer using multiple accounts, a family, a company, or other groups of customers, about what the targeted audience is likely to purchase in the future, how frequently, and their likely budgets for such future purchases. Intelligence information is useful in selecting the advertisements that are most useful, effective and compelling to the customer, thus increasing the efficiency and effectiveness of the advertising process.

In one embodiment, the transaction data (109) are enhanced with correlation results (123) correlating past advertisements and purchases that result at least in part from the advertisements. Thus, the intelligence information can be more accurate in assisting with the selection of the advertisements. The intelligence information may not only indicate what the audience is likely to purchase, but also how likely the audience is to be influenced by advertisements for certain purchases, and the relative effectiveness of different forms of advertisements for the audience. Thus, the advertisement selector (133) can select the advertisements to best use the opportunity to communicate with the audience. Further, the transaction data (109) can be enhanced via other data elements, such as program enrollment, affinity programs, redemption of reward points (or other types of offers), online activities, such as web searches and web browsing, social networking information, etc., based on the account data (111) and/or other data, such as non-transactional data discussed in U.S. patent application Ser. No. 12/614,603, filed Nov. 9, 2009, assigned Pub. No. 2011/0054981, and entitled "Analyzing Local Non-Transactional Data with Transactional Data in Predictive Models," the disclosure of which is hereby incorporated herein by reference.

In one embodiment, the entity operating the transaction handler (103) provides the intelligence information in real-time as the request for the intelligence information occurs. In other embodiments, the entity operating the transaction handler (103) may provide the intelligence information in batch mode. The intelligence information can be delivered via online communications (e.g., via an application programming interface (API) on a website, or other information server), or via physical transportation of a computer readable media that stores the data representing the intelligence information.

In one embodiment, the intelligence information is communicated to various entities in the system in a way similar to, and/or in parallel with the information flow in the transaction system to move money. The transaction handler (103) routes the information in the same way it routes the currency involved in the transactions.

In one embodiment, the portal (143) provides a user interface to allow the user (101) to select items offered on different merchant websites and store the selected items in a wish list for comparison, reviewing, purchasing, tracking, etc. The information collected via the wish list can be used to improve the transaction profiles (127) and derive intelligence on the needs of the user (101); and targeted advertisements can be delivered to the user (101) via the wish list user interface provided by the portal (143). Examples of user interface systems to manage wish lists are provided in U.S. Pat. App. Pub. No. 2010/0174623, entitled "System and Method for Managing Items of Interest Selected from Online Merchants," the disclosure of which is hereby incorporated herein by reference.

Aggregated Spending Profile

In one embodiment, the characteristics of transaction patterns of customers are profiled via clusters, factors, and/or categories of purchases. The transaction data (109) may include transaction records (301); and in one embodiment, an aggregated spending profile (341) is generated from the transaction records (301), in a way illustrated in FIG. 2, to summarize the spending behavior reflected in the transaction records (301).

When there is voluminous data representing the transaction records (301), the spending patterns reflected in the transaction records (301) can be difficult to recognize by an ordinary person.

In one embodiment, the voluminous transaction records (301) are summarized (335) into aggregated spending profiles (e.g., 341) to concisely present the statistical spending characteristics reflected in the transaction records (301). The aggregated spending profile (341) uses values derived from statistical analysis to present the statistical characteristics of transaction records (301) of an entity in a way easy to understand by an ordinary person.

In FIG. 2, the transaction records (301) are summarized (335) via factor analysis (327) to condense the variables (e.g., 313, 315) and via cluster analysis (329) to segregate entities by spending patterns.

In FIG. 2, a set of variables (e.g., 311, 313, 315) are defined based on the parameters recorded in the transaction records (301). The variables (e.g., 311, 313, and 315) are defined in a way to have meanings easily understood by an ordinary person. For example, variables (311) measure the aggregated spending in super categories; variables (313) measure the spending frequencies in various areas; and variables (315) measure the spending amounts in various areas. In one embodiment, each of the areas is identified by a merchant category (306) (e.g., as represented by a merchant category code (MCC), a North American Industry Classification System (NAICS) code, or a similarly standardized category code). In other embodiments, an area may be identified by a product category, a SKU number, etc.

In one embodiment, a variable of a same category (e.g., frequency (313) or amount (315)) is defined to be aggregated over a set of mutually exclusive areas. A transaction is classified in only one of the mutually exclusive areas. For example, in one embodiment, the spending frequency variables (313) are defined for a set of mutually exclusive merchants or merchant categories. Transactions falling with the same category are aggregated.

Examples of the spending frequency variables (313) and spending amount variables (315) defined for various merchant categories (e.g., 306) in one embodiment are provided in U.S. Pat. App. Pat. App. Pub. No. 2010/0306029, entitled "Cardholder Clusters," and in U.S. Pat. App. Pub. No. 2010/0306032, entitled "Systems and Methods to Summarize Transaction Data," the disclosures of which applications are hereby incorporated herein by reference.

In one embodiment, super categories (311) are defined to group the categories (e.g., 306) used in transaction records (301). The super categories (311) can be mutually exclusive. For example, each merchant category (306) is classified under only one super merchant category but not any other super merchant categories. Since the generation of the list of super categories typically requires deep domain knowledge about the businesses of the merchants in various categories, super categories (311) are not used in one embodiment.

In one embodiment, the aggregation (317) includes the application of the definitions (309) for these variables (e.g., 311, 313, and 315) to the transaction records (301) to generate the variable values (321). The transaction records (301) are aggregated to generate aggregated measurements (e.g., variable values (321)) that are not specific to a particular transaction, such as frequencies of purchases made with different merchants or different groups of merchants, the amounts spent with different merchants or different groups of merchants, and the number of unique purchases across different merchants or different groups of merchants, etc. The aggregation (317) can be performed for a particular time period and for entities at various levels.

In one embodiment, the transaction records (301) are aggregated according to a buying entity. The aggregation (317) can be performed at account level, person level, family level, company level, neighborhood level, city level, region level, etc. to analyze the spending patterns across various areas (e.g., sellers, products or services) for the respective aggregated buying entity. For example, the transaction records (301) for a particular account (e.g., presented by the account number (302)) can be aggregated for an account level analysis. To aggregate the transaction records (301) in account level, the transactions with a specific merchant or merchants in a specific category are counted according to the variable definitions (309) for a particular account to generate a frequency measure (e.g., 313) for the account relative to the specific merchant or merchant category; and the transaction amounts (e.g., 304) with the specific merchant or the specific category of merchants are summed for the particular account to generate an average spending amount for the account relative to the specific merchant or merchant category. For example, the transaction records (301) for a particular person having multiple accounts can be aggregated for a person level analysis, the transaction records (301) aggregated for a particular family for a family level analysis, and the transaction records (301) for a particular business aggregated for a business level analysis.

The aggregation (317) can be performed for a predetermined time period, such as for the transactions occurring in the past month, in the past three months, in the past twelve months, etc.

In another embodiment, the transaction records (301) are aggregated according to a selling entity. The spending patterns at the selling entity across various buyers, products or services can be analyzed. For example, the transaction records (301) for a particular merchant having transactions with multiple accounts can be aggregated for a merchant level analysis. For example, the transaction records (301) for a particular merchant group can be aggregated for a merchant group level analysis.

In one embodiment, the aggregation (317) is formed separately for different types of transactions, such as transactions made online, offline, via phone, and/or "card-present" transactions vs. "card-not-present" transactions, which can be used to identify the spending pattern differences among different types of transactions.

In one embodiment, the variable values (e.g., 323, 324, ..., 325) associated with an entity ID (322) are considered the random samples of the respective variables (e.g., 311, 313, 315), sampled for the instance of an entity represented by the entity ID (322). Statistical analyses (e.g., factor analysis (327) and cluster analysis (329)) are performed to identify the patterns and correlations in the random samples.

For example, a cluster analysis (329) can identify a set of clusters and thus cluster definitions (333) (e.g., the locations of the centroids of the clusters). In one embodiment, each entity ID (322) is represented as a point in a mathematical space defined by the set of variables; and the variable values (323, 324, ..., 325) of the entity ID (322) determine the coordinates of the point in the space and thus the location of the point in the space. Various points may be concentrated in various regions; and the cluster analysis (329) is configured to formulate the positioning of the points to drive the clustering of the points. In other embodiments, the cluster analysis (329) can also be performed using the techniques of Self Organizing Maps (SOM), which can identify and show clusters of multi-dimensional data using a representation on a two-dimensional map.

Once the cluster definitions (333) are obtained from the cluster analysis (329), the identity of the cluster (e.g., cluster ID (343)) that contains the entity ID (322) can be used to characterize spending behavior of the entity represented by the entity ID (322). The entities in the same cluster are considered to have similar spending behaviors.

Similarities and differences among the entities, such as accounts, individuals, families, etc., as represented by the entity ID (e.g., 322) and characterized by the variable values (e.g., 323, 324, ..., 325) can be identified via the cluster analysis (329). In one embodiment, after a number of clusters of entity IDs are identified based on the patterns of the aggregated measurements, a set of profiles can be generated for the clusters to represent the characteristics of the clusters. Once the clusters are identified, each of the entity IDs (e.g., corresponding to an account, individual, family) can be assigned to one cluster; and the profile for the corresponding cluster may be used to represent, at least in part, the entity (e.g., account, individual, family). Alternatively, the relationship between an entity (e.g., an account, individual, family) and one or more clusters can be determined (e.g., based on a measurement of closeness to each cluster). Thus, the cluster related data can be used in a transaction profile (127 or 341) to provide information about the behavior of the entity (e.g., an account, an individual, a family).

In one embodiment, more than one set of cluster definitions (333) is generated from cluster analyses (329). For example, cluster analyses (329) may generate different sets of cluster solutions corresponding to different numbers of identified clusters. A set of cluster IDs (e.g., 343) can be used to summarize (335) the spending behavior of the entity represented by the entity ID (322), based on the typical spending behavior of the respective clusters. In one example, two cluster solutions are obtained; one of the cluster solutions has 17 clusters, which classify the entities in a relatively coarse manner; and the other cluster solution has 55 clusters, which classify the entities in a relative fine manner. A cardholder can be identified by the spending behavior of one of the 17 clusters and one of the 55 clusters in which the cardholder is located. Thus, the set of cluster IDs corresponding to the set of cluster solutions provides a hierarchical identification of an entity among clusters of different levels of resolution. The spending behavior of the clusters is represented by the cluster definitions (333), such as the parameters (e.g., variable values) that define the centroids of the clusters.

In one embodiment, the random variables (e.g., 313 and 315) as defined by the definitions (309) have certain degrees of correlation and are not independent from each other. For example, merchants of different merchant categories (e.g., 306) may have overlapping business, or have certain business relationships. For example, certain products and/or services of certain merchants have cause and effect relationships. For example, certain products and/or services of certain merchants are mutually exclusive to a certain degree (e.g., a purchase from one merchant may have a level of probability to exclude the user (101) from making a purchase from another merchant). Such relationships may be complex and difficult to quantify by merely inspecting the categories. Further, such relationships may shift over time as the economy changes.

In one embodiment, a factor analysis (327) is performed to reduce the redundancy and/or correlation among the variables (e.g., 313, 315). The factor analysis (327) identifies the definitions (331) for factors, each of which represents a combination of the variables (e.g., 313, 315).

In one embodiment, a factor is a linear combination of a plurality of the aggregated measurements (e.g., variables (313, 315)) determined for various areas (e.g., merchants or merchant categories, products or product categories). Once the relationship between the factors and the aggregated measurements is determined via factor analysis, the values for the factors can be determined from the linear combinations of the aggregated measurements and be used in a transaction profile (127 or 341) to provide information on the behavior of the entity represented by the entity ID (e.g., an account, an individual, a family).

Once the factor definitions (331) are obtained from the factor analysis (327), the factor definitions (331) can be applied to the variable values (321) to determine factor values (344) for the aggregated spending profile (341). Since redundancy and correlation are reduced in the factors, the number of factors is typically much smaller than the number of the original variables (e.g., 313, 315). Thus, the factor values (344) represent the concise summary of the original variables (e.g., 313, 315).

For example, there may be thousands of variables on spending frequency and amount for different merchant categories; and the factor analysis (327) can reduce the factor number to less than one hundred (and even less than twenty). In one example, a twelve-factor solution is obtained, which allows the use of twelve factors to combine the thousands of the original variables (313, 315); and thus, the spending behavior in thousands of merchant categories can be summarized via twelve factor values (344). In one embodiment, each factor is combination of at least four variables; and a typical variable has contributions to more than one factor.

In one example, hundreds or thousands of transaction records (301) of a cardholder are converted into hundreds or thousands of variable values (321) for various merchant categories, which are summarized (335) via the factor definitions (331) and cluster definitions (333) into twelve factor values (344) and one or two cluster IDs (e.g., 343). The summarized data can be readily interpreted by a human to ascertain the spending behavior of the cardholder. A user (101) may easily specify a spending behavior requirement formulated based on the factor values (344) and the cluster IDs (e.g., to query for a segment of customers, or to request the targeting of a segment of customers). The reduced size of the summarized data reduces the need for data communication bandwidth for communicating the spending behavior of the cardholder over a network connection and allows simplified processing and utilization of the data representing the spending behavior of the cardholder.

In one embodiment, the behavior and characteristics of the clusters are studied to identify a description of a type of representative entities that are found in each of the clusters. The clusters can be named based on the type of representative entities to allow an ordinary person to easily understand the typical behavior of the clusters.

In one embodiment, the behavior and characteristics of the factors are also studied to identify dominant aspects of each factor. The clusters can be named based on the dominant aspects to allow an ordinary person to easily understand the meaning of a factor value.

In FIG. 2, an aggregated spending profile (341) for an entity represented by an entity ID (e.g., 322) includes the cluster ID (343) and factor values (344) determined based on the cluster definitions (333) and the factor definitions (331). The aggregated spending profile (341) may further include other statistical parameters, such as diversity index (342), channel distribution (345), category distribution (346), zip code (347), etc., as further discussed below.

In one embodiment, the diversity index (342) may include an entropy value and/or a Gini coefficient, to represent the diversity of the spending by the entity represented by the entity ID (322) across different areas (e.g., different merchant categories (e.g., 306)). When the diversity index (342) indicates that the diversity of the spending data is under a predetermined threshold level, the variable values (e.g., 323, 324, . . . , 325) for the corresponding entity ID (322) may be excluded from the cluster analysis (329) and/or the factor analysis (327) due to the lack of diversity. When the diversity index (342) of the aggregated spending profile (341) is lower than a predetermined threshold, the factor values (344) and the cluster ID (343) may not accurately represent the spending behavior of the corresponding entity.

In one embodiment, the channel distribution (345) includes a set of percentage values that indicate the percentages of amounts spent in different purchase channels, such as online, via phone, in a retail store, etc.

In one embodiment, the category distribution (346) includes a set of percentage values that indicate the percentages of spending amounts in different super categories (311). In one embodiment, thousands of different merchant categories (e.g., 306) are represented by Merchant Category Codes (MCC), or North American Industry Classification System (NAICS) codes in transaction records (301). These merchant categories (e.g., 306) are classified or combined into less than one hundred super categories (or less than twenty). In one example, fourteen super categories are defined based on domain knowledge.

In one embodiment, the aggregated spending profile (341) includes the aggregated measurements (e.g., frequency, average spending amount) determined for a set of predefined, mutually exclusive merchant categories (e.g., super categories (311)). Each of the super merchant categories represents a type of products or services a customer may purchase. A transaction profile (127 or 341) may include the aggregated measurements for each of the set of mutually exclusive merchant categories. The aggregated measurements determined for the predefined, mutually exclusive merchant categories can be used in transaction profiles (127 or 341) to provide information on the behavior of a respective entity (e.g., an account, an individual, or a family).

In one embodiment, the zip code (347) in the aggregated spending profile (341) represents the dominant geographic area in which the spending associated with the entity ID (322) occurred. Alternatively or in combination, the aggregated spending profile (341) may include a distribution of transaction amounts over a set of zip codes that account for a majority of the transactions or transaction amounts (e.g., 90%).

In one embodiment, the factor analysis (327) and cluster analysis (329) are used to summarize the spending behavior across various areas, such as different merchants characterized by merchant category (306), different products and/or services, different consumers, etc. The aggregated spending profile (341) may include more or fewer fields than those illustrated in FIG. 2. For example, in one embodiment, the aggregated spending profile (341) further includes an aggregated spending amount for a period of time (e.g., the past twelve months); in another embodiment, the aggregated spending profile (341) does not include the category distribution (346); and in a further embodiment, the aggregated spending profile (341) may include a set of distance measures to the centroids of the clusters. The distance measures may be defined based on the variable values (323, 324, . . . , 325), or based on the factor values (344). The factor values of the centroids of the clusters may be estimated based on the entity ID (e.g., 322) that is closest to the centroid in the respective cluster.

Other variables can be used in place of, or in additional to, the variables (311, 313, 315) illustrated in FIG. 2. For example, the aggregated spending profile (341) can be generated using variables measuring shopping radius/distance from the primary address of the account holder to the merchant site for offline purchases. When such variables are used, the transaction patterns can be identified based at least in part on clustering according to shopping radius/distance and geographic regions. Similarly, the factor definition (331) may include the consideration of the shopping radius/distance. For example, the transaction records (301) may be aggregated based on the ranges of shopping radius/distance and/or geographic regions. For example, the factor analysis can be used to determine factors that naturally combine geographical areas based on the correlations in the spending patterns in various geographical areas.

In one embodiment, the aggregation (317) may involve the determination of a deviation from a trend or pattern. For example, an account makes a certain number of purchases a week at a merchant over the past 6 months. However, in the past 2 weeks the number of purchases is less than the average number per week. A measurement of the deviation from the trend or pattern can be used (e.g., in a transaction profile (127 or 341) as a parameter, or in variable definitions (309) for the factor analysis (327) and/or the cluster analysis) to define the behavior of an account, an individual, a family, etc.

FIG. 3 shows a method to generate an aggregated spending profile according to one embodiment. In FIG. 3, computation models are established (351) for variables (e.g., 311, 313, and 315). In one embodiment, the variables are defined in a way to capture certain aspects of the spending statistics, such as frequency, amount, etc.

In FIG. 3, data from related accounts are combined (353). For example, when an account number change has occurred for a cardholder in the time period under analysis, the transaction records (301) under the different account numbers of the same cardholder are combined under one account number that represents the cardholder. For example, when the analysis is performed at a person level (or family level, business level, social group level, city level, or region level), the transaction records (301) in different accounts of the person (or family, business, social group, city or region) can be combined under one entity ID (322) that represents the person (or family, business, social group, city or region).

In one embodiment, recurrent/installment transactions are combined (355). For example, multiple monthly payments may be combined and considered as one single purchase.

In FIG. 3, account data are selected (357) according to a set of criteria related to activity, consistency, diversity, etc.

For example, when a cardholder uses a credit card solely to purchase gas, the diversity of the transactions by the cardholder is low. In such a case, the transactions in the account of the cardholder may not be statistically meaningful to represent the spending pattern of the cardholder in various merchant categories. Thus, in one embodiment, if the diversity of the transactions associated with an entity ID (322) is below a threshold, the variable values (e.g., 323, 324, . . . , 325) corresponding to the entity ID (322) are not used in the cluster analysis (329) and/or the factor analysis (327). The diversity can be examined based on the diversity index (342) (e.g., entropy or Gini coefficient), or based on counting the different merchant categories in the transactions associated with the entity ID (322); and when the count of different merchant categories is fewer than a threshold (e.g., 5), the transactions associated with the entity ID (322) are not used in the cluster analysis (329) and/or the factor analysis (327) due to the lack of diversity.

For example, when a cardholder uses a credit card only sporadically (e.g., when running out of cash), the limited transactions by the cardholder may not be statistically meaningful in representing the spending behavior of the cardholder. Thus, in one embodiment, when the numbers of transactions associated with an entity ID (322) is below a threshold, the variable values (e.g., 323, 324, . . . , 325) corresponding to the entity ID (322) are not used in the cluster analysis (329) and/or the factor analysis (327).

For example, when a cardholder has only used a credit card during a portion of the time period under analysis, the transaction records (301) during the time period may not reflect the consistent behavior of the cardholder for the entire time period. Consistency can be checked in various ways. In one example, if the total number of transactions during the first and last months of the time period under analysis is zero, the transactions associated with the entity ID (322) are inconsistent in the time period and thus are not used in the cluster analysis (329) and/or the factor analysis (327). Other criteria can be formulated to detect inconsistency in the transactions.

In FIG. 3, the computation models (e.g., as represented by the variable definitions (309)) are applied (359) to the remaining account data (e.g., transaction records (301)) to obtain data samples for the variables. The data points associated with the entities, other than those whose transactions fail to meet the minimum requirements for activity, consistency, diversity, etc., are used in factor analysis (327) and cluster analysis (329).

In FIG. 3, the data samples (e.g., variable values (321)) are used to perform (361) factor analysis (327) to identify factor solutions (e.g., factor definitions (331)). The factor solutions can be adjusted (363) to improve similarity in factor values of different sets of transaction data (109). For example, factor definitions (331) can be applied to the transactions in the time period under analysis (e.g., the past twelve months) and be applied separately to the transactions in a prior time period (e.g., the twelve months before the past twelve months) to obtain two sets of factor values. The factor definitions (331) can be adjusted to improve the correlation between the two set of factor values.

The data samples can also be used to perform (365) cluster analysis (329) to identify cluster solutions (e.g., cluster definitions (333)). The cluster solutions can be adjusted (367) to improve similarity in cluster identifications based on different sets of transaction data (109). For example, cluster definitions (333) can be applied to the transactions in the time period under analysis (e.g., the past twelve months) and be applied separately to the transactions in a prior time period (e.g., the twelve months before the past twelve months) to obtain two sets of cluster identifications for various entities. The cluster definitions (333) can be adjusted to improve the correlation between the two set of cluster identifications.

In one embodiment, the number of clusters is determined from clustering analysis. For example, a set of cluster seeds can be initially identified and used to run a known clustering algorithm. The sizes of data points in the clusters are then examined. When a cluster contains less than a predetermined number of data points, the cluster may be eliminated to rerun the clustering analysis.

In one embodiment, standardizing entropy is added to the cluster solution to obtain improved results.

In one embodiment, human understandable characteristics of the factors and clusters are identified (369) to name the factors and clusters. For example, when the spending behavior of a cluster appears to be the behavior of an internet loyalist, the cluster can be named "internet loyalist" such that if a cardholder is found to be in the "internet loyalist" cluster, the spending preferences and patterns of the cardholder can be easily perceived.

In one embodiment, the factor analysis (327) and the cluster analysis (329) are performed periodically (e.g., once a year, or six months) to update the factor definitions (331) and the cluster definitions (333), which may change as the economy and the society change over time.

In FIG. 3, transaction data (109) are summarized (371) using the factor solutions and cluster solutions to generate the aggregated spending profile (341). The aggregated spending profile (341) can be updated more frequently than the factor solutions and cluster solutions, when the new transaction data (109) becomes available. For example, the aggregated spending profile (341) may be updated quarterly or monthly.

Various tweaks and adjustments can be made for the variables (e.g., 313, 315) used for the factor analysis (327) and the cluster analysis (329). For example, the transaction records (301) may be filtered, weighted or constrained, according to different rules to improve the capabilities of the aggregated measurements in indicating certain aspects of the spending behavior of the customers.

Transaction Data Based Portal

In FIG. 1, the transaction terminal (105) initiates the transaction for a user (101) (e.g., a customer) for processing by a transaction handler (103). The transaction handler (103) processes the transaction and stores transaction data (109) about the transaction, in connection with account data (111), such as the account profile of an account of the user (101). The account data (111) may further include data about the user (101), collected from issuers or merchants, and/or other sources, such as social networks, credit bureaus, merchant provided information, address information, etc. In one embodiment, a transaction may be initiated by a server (e.g., based on a stored schedule for recurrent payments).

Over a period of time, the transaction handler (103) accumulates the transaction data (109) from transactions initiated at different transaction terminals (e.g., 105) for different users (e.g., 101). The transaction data (109) thus includes information on purchases made by various users (e.g., 101) at various times via different purchases options (e.g., online purchase, offline purchase from a retail store, mail order, order via phone, etc.)

In one embodiment, the accumulated transaction data (109) and the corresponding account data (111) are used to generate intelligence information about the purchase behavior, pattern, preference, tendency, frequency, trend, amount and/or propensity of the users (e.g., 101), as individuals or as a member of a group. The intelligence information can then be used to generate, identify and/or select targeted advertisements for presentation to the user (101) on the point of interaction (107), during a transaction, after a transaction, or when other opportunities arise.

FIG. 4 shows a system to provide information based on transaction data (109) according to one embodiment. In FIG. 4, the transaction handler (103) is coupled between an issuer processor (145) and an acquirer processor (147) to facilitate authorization and settlement of transactions between a consumer account (146) and a merchant account (148). The transaction handler (103) records the transactions in the data warehouse (149). The portal (143) is coupled to the data warehouse (149) to provide information based on the transaction records (301), such as the transaction profiles (127) or aggregated spending profile (341). The portal (143) may be implemented as a web portal, a telephone gateway, a file/data server, etc.

In one embodiment, the portal (143) is configured to receive queries identifying search criteria from the profile selector (129), the advertisement selector (133) and/or third parties and in response, to provide transaction-based intelligence requested by the queries.

In one embodiment, the portal (143) is configured to register certain users (101) for various programs, such as a loyalty program to provide rewards and/or offers to the users (101).

In one embodiment, the portal (143) is to register the interest of users (101), or to obtain permissions from the users (101) to gather further information about the users (101), such as data capturing purchase details, online activities, etc.

In one embodiment, the user (101) may register via the issuer; and the registration data in the consumer account (146) may propagate to the data warehouse (149) upon approval from the user (101).

In one embodiment, the portal (143) is to register merchants and provide services and/or information to merchants.

In one embodiment, the portal (143) is to receive information from third parties, such as search engines, merchants, websites, etc. The third party data can be correlated with the transaction data (109) to identify the relationships between purchases and other events, such as searches, news announcements, conferences, meetings, etc., and improve the prediction capability and accuracy.

In FIG. 4, the consumer account (146) is under the control of the issuer processor (145). The consumer account (146) may be owned by an individual, or an organization such as a business, a school, etc. The consumer account (146) may be a credit account, a debit account, or a stored value account. The issuer may provide the consumer (e.g., user (101)) an account identification device (141) to identify the consumer account (146) using the account information (142). The respective consumer of the account (146) can be called an account holder or a cardholder, even when the consumer is not physically issued a card, or the account identification device (141), in one embodiment. The issuer processor (145) is to charge the consumer account (146) to pay for purchases.

In one embodiment, the account identification device (141) is a plastic card having a magnetic strip storing account information (142) identifying the consumer account (146) and/or the issuer processor (145). Alternatively, the account identification device (141) is a smartcard having an integrated circuit chip storing at least the account information (142). In one embodiment, the account identification device (141) includes a mobile phone having an integrated smartcard.

In one embodiment, the account information (142) is printed or embossed on the account identification device (141). The account information (142) may be printed as a bar code to allow the transaction terminal (105) to read the information via an optical scanner. The account information (142) may be stored in a memory of the account identification device (141) and configured to be read via wireless, contactless communications, such as near field communications via magnetic field coupling, infrared communications, or radio frequency communications. Alternatively, the transaction terminal (105) may require contact with the account identification device (141) to read the account information (142) (e.g., by reading the magnetic strip of a card with a magnetic strip reader).

In one embodiment, the transaction terminal (105) is configured to transmit an authorization request message to the acquirer processor (147). The authorization request includes the account information (142), an amount of payment, and information about the merchant (e.g., an indication of the merchant account (148)). The acquirer processor (147) requests the transaction handler (103) to process the authorization request, based on the account information (142) received in the transaction terminal (105). The transaction handler (103) routes the authorization request to the issuer processor (145) and may process and respond to the authorization request when the issuer processor (145) is not available. The issuer processor (145) determines whether to authorize the transaction based at least in part on a balance of the consumer account (146).

In one embodiment, the transaction handler (103), the issuer processor (145), and the acquirer processor (147) may each include a subsystem to identify the risk in the transaction and may reject the transaction based on the risk assessment.

In one embodiment, the account identification device (141) includes security features to prevent unauthorized uses of the consumer account (146), such as a logo to show the authenticity of the account identification device (141), encryption to protect the account information (142), etc.

In one embodiment, the transaction terminal (105) is configured to interact with the account identification device (141) to obtain the account information (142) that identifies the consumer account (146) and/or the issuer processor (145). The transaction terminal (105) communicates with the acquirer processor (147) that controls the merchant account (148) of a merchant. The transaction terminal (105) may communicate with the acquirer processor (147) via a data communication connection, such as a telephone connection, an Internet connection, etc. The acquirer processor (147) is to collect payments into the merchant account (148) on behalf of the merchant.

In one embodiment, the transaction terminal (105) is a POS terminal at a traditional, offline, "brick and mortar" retail store. In another embodiment, the transaction terminal (105) is an online server that receives account information (142) of the consumer account (146) from the user (101) through a web connection. In one embodiment, the user (101) may provide account information (142) through a telephone call, via verbal communications with a representative of the merchant; and the representative enters the account information (142) into the transaction terminal (105) to initiate the transaction.

In one embodiment, the account information (142) can be entered directly into the transaction terminal (105) to make payment from the consumer account (146), without having to physically present the account identification device (141). When a transaction is initiated without physically presenting an account identification device (141), the transaction is classified as a "card-not-present" (CNP) transaction.

In one embodiment, the issuer processor (145) may control more than one consumer account (146); the acquirer processor (147) may control more than one merchant account (148); and the transaction handler (103) is connected between a plurality of issuer processors (e.g., 145) and a plurality of acquirer processors (e.g., 147). An entity (e.g., bank) may operate both an issuer processor (145) and an acquirer processor (147).

In one embodiment, the transaction handler (103), the issuer processor (145), the acquirer processor (147), the transaction terminal (105), the portal (143), and other devices and/or services accessing the portal (143) are connected via communications networks, such as local area networks, cellular telecommunications networks, wireless wide area networks, wireless local area networks, an intranet, and Internet. In one embodiment, dedicated communication channels are used between the transaction handler (103) and the issuer processor (145), between the transaction handler (103) and the acquirer processor (147), and/or between the portal (143) and the transaction handler (103).

In one embodiment, the transaction handler (103) uses the data warehouse (149) to store the records about the transactions, such as the transaction records (301) or transaction data (109). In one embodiment, the transaction handler (103) includes a powerful computer, or cluster of computers functioning as a unit, controlled by instructions stored on a computer readable medium.

In one embodiment, the transaction handler (103) is configured to support and deliver authorization services, exception file services, and clearing and settlement services. In one embodiment, the transaction handler (103) has a subsystem to process authorization requests and another subsystem to perform clearing and settlement services.

In one embodiment, the transaction handler (103) is configured to process different types of transactions, such credit card transactions, debit card transactions, prepaid card transactions, and other types of commercial transactions.

In one embodiment, the transaction handler (103) facilitates the communications between the issuer processor (145) and the acquirer processor (147).

In one embodiment, the transaction handler (103) is coupled to the portal (143) (and/or the profile selector (129), the advertisement selector (133), the media controller (115)) to charge the fees for the services of providing the transaction-based intelligence information and/or advertisement.

For example, in one embodiment, the system illustrated in FIG. 1 is configured to deliver advertisements to the point of interaction (107) of the user (101), based on the transaction-based intelligence information; and the transaction handler (103) is configured to charge the advertisement fees to the account of the advertiser in communication with the issuer processor in control of the account of the advertiser. The advertisement fees may be charged in response to the presentation of the advertisement, or in response to the completion of a pre-determined number of presentations, or in response to a transaction resulted from the presentation of the advertisement. In one embodiment, the transaction handler (103) is configured to a periodic fee (e.g., monthly fee, annual fee) to the account of the advertiser in communication with the respective issuer processor that is similar to the issuer processor (145) of the consumer account (146).

For example, in one embodiment, the portal (143) is configured to provide transaction-based intelligence information in response to the queries received in the portal (143). The portal (143) is to identify the requesters (e.g., via an authentication, or the address of the requesters) and instruct the transaction handler (103) to charge the consumer accounts (e.g., 146) of the respective requesters for the transaction-based intelligence information. In one embodiment, the accounts of the requesters are charged in response to the delivery of the intelligence information via the portal (143). In one embodiment, the accounts of the requesters are charged a periodic subscription fee for the access to the query capability of the portal (143).

In one embodiment, the information service provided by the system illustrated in FIG. 1 includes multiple parties, such as one entity operating the transaction handler (103), one entity operating the advertisement data (135), one entity operating the user tracker (113), one entity operating the media controller (115), etc. The transaction handler (103) is used to generate transactions to settle the fees, charges and/or divide revenues using the accounts of the respective parties. In one embodiment, the account information of the parties is stored in the data warehouse (149) coupled to the transaction handler (103). In some embodiments, a separate billing engine is used to generate the transactions to settle the fees, charges and/or divide revenues.

In one embodiment, the transaction terminal (105) is configured to submit the authorized transactions to the acquirer processor (147) for settlement. The amount for the settlement may be different from the amount specified in the authorization request. The transaction handler (103) is coupled between the issuer processor (145) and the acquirer processor (147) to facilitate the clearing and settling of the transaction. Clearing includes the exchange of financial information between the issuer processor (145) and the acquirer processor (147); and settlement includes the exchange of funds.

In one embodiment, the issuer processor (145) is to provide funds to make payments on behalf of the consumer account (146). The acquirer processor (147) is to receive the funds on behalf of the merchant account (148). The issuer processor (145) and the acquirer processor (147) communicate with the transaction handler (103) to coordinate the transfer of funds for the transaction. In one embodiment, the funds are transferred electronically.

In one embodiment, the transaction terminal (105) may submit a transaction directly for settlement, without having to separately submit an authorization request.

In one embodiment, the portal (143) provides a user interface to allow the user (101) to organize the transactions in one or more consumer accounts (146) of the user with one or more issuers. The user (101) may organize the transactions using information and/or categories identified in the transaction records (301), such as merchant category (306), transaction date (303), amount (304), etc. Examples and techniques in one embodiment are provided in U.S. Pat. App. Pub. No. 2007/0055597, entitled "Method and System for Manipulating Purchase Information," the disclosure of which is hereby incorporated herein by reference.

In one embodiment, the portal (143) provides transaction based statistics, such as indicators for retail spending monitoring, indicators for merchant benchmarking, industry/market segmentation, indicators of spending patterns, etc. Further examples can be found in U.S. Pat. App. Pub. No. 2009/0048884, entitled "Merchant Benchmarking Tool," the disclosure of which application is hereby incorporated herein by reference.

Transaction Terminal

FIG. 5 illustrates a transaction terminal according to one embodiment. In FIG. 5, the transaction terminal (105) is configured to interact with an account identification device (141) to obtain account information (142) about the consumer account (146).

In one embodiment, the transaction terminal (105) includes a memory (167) coupled to the processor (151), which controls the operations of a reader (163), an input device (153), an output device (165) and a network interface (161). The memory (167) may store instructions for the processor (151) and/or data, such as an identification that is associated with the merchant account (148).

In one embodiment, the reader (163) includes a magnetic strip reader. In another embodiment, the reader (163) includes a contactless reader, such as a radio frequency identification (RFID) reader, a near field communications (NFC) device configured to read data via magnetic field coupling (in accordance with ISO standard 14443/NFC), a Bluetooth transceiver, a WiFi transceiver, an infrared transceiver, a laser scanner, etc.

In one embodiment, the input device (153) includes key buttons that can be used to enter the account information (142) directly into the transaction terminal (105) without the physical presence of the account identification device (141). The input device (153) can be configured to provide further information to initiate a transaction, such as a personal identification number (PIN), password, zip code, etc. that may be used to access the account identification device (141), or in combination with the account information (142) obtained from the account identification device (141).

In one embodiment, the output device (165) may include a display, a speaker, and/or a printer to present information, such as the result of an authorization request, a receipt for the transaction, an advertisement, etc.

In one embodiment, the network interface (161) is configured to communicate with the acquirer processor (147) via a telephone connection, an Internet connection, or a dedicated data communication channel.

In one embodiment, the instructions stored in the memory (167) are configured at least to cause the transaction terminal (105) to send an authorization request message to the acquirer processor (147) to initiate a transaction. The transaction terminal (105) may or may not send a separate request for the clearing and settling of the transaction. The instructions stored in the memory (167) are also configured to cause the transaction terminal (105) to perform other types of functions discussed in this description.

In one embodiment, a transaction terminal (105) may have fewer components than those illustrated in FIG. 5. For example, in one embodiment, the transaction terminal (105) is configured for "card-not-present" transactions; and the transaction terminal (105) does not have a reader (163).

In one embodiment, a transaction terminal (105) may have more components than those illustrated in FIG. 5. For example, in one embodiment, the transaction terminal (105) is an ATM machine, which includes components to dispense cash under certain conditions.

Account Identification Device

FIG. 6 illustrates an account identifying device according to one embodiment. In FIG. 6, the account identification device (141) is configured to carry account information (142) that identifies the consumer account (146).

In one embodiment, the account identification device (141) includes a memory (167) coupled to the processor (151), which controls the operations of a communication device (159), an input device (153), an audio device (157) and a display device (155). The memory (167) may store instructions for the processor (151) and/or data, such as the account information (142) associated with the consumer account (146).

In one embodiment, the account information (142) includes an identifier identifying the issuer (and thus the issuer processor (145)) among a plurality of issuers, and an identifier identifying the consumer account among a plurality of consumer accounts controlled by the issuer processor (145). The account information (142) may include an expiration date of the account identification device (141), the name of the consumer holding the consumer account (146), and/or an identifier identifying the account identification device (141) among a plurality of account identification devices associated with the consumer account (146).

In one embodiment, the account information (142) may further include a loyalty program account number, accumulated rewards of the consumer in the loyalty program, an address of the consumer, a balance of the consumer account (146), transit information (e.g., a subway or train pass), access information (e.g., access badges), and/or consumer information (e.g., name, date of birth), etc.

In one embodiment, the memory includes a nonvolatile memory, such as magnetic strip, a memory chip, a flash memory, a Read Only Memory (ROM), etc. to store the account information (142).

In one embodiment, the information stored in the memory (167) of the account identification device (141) may also be in the form of data tracks that are traditionally associated with credits cards. Such tracks include Track 1 and Track 2. Track 1 ("International Air Transport Association") stores more information than Track 2, and contains the cardholder's name as well as the account number and other discretionary data. Track 1 is sometimes used by airlines when securing reservations with a credit card. Track 2 ("American Banking Association") is currently most commonly used and is read by ATMs and credit card checkers. The ABA (American Banking Association) designed the specifications of Track 1 and banks abide by it. It contains the cardholder's account number, encrypted PIN, and other discretionary data.

In one embodiment, the communication device (159) includes a semiconductor chip to implement a transceiver for communication with the reader (163) and an antenna to provide and/or receive wireless signals.

In one embodiment, the communication device (159) is configured to communicate with the reader (163). The communication device (159) may include a transmitter to transmit the account information (142) via wireless transmissions, such as radio frequency signals, magnetic coupling, or infrared, Bluetooth or WiFi signals, etc.

In one embodiment, the account identification device (141) is in the form of a mobile phone, personal digital assistant (PDA), etc. The input device (153) can be used to provide input to the processor (151) to control the operation of the account identification device (141); and the audio device (157) and the display device (155) may present status information and/or other information, such as advertisements or offers. The account identification device (141) may include further components that are not shown in FIG. 6, such as a cellular communications subsystem.

In one embodiment, the communication device (159) may access the account information (142) stored on the memory (167) without going through the processor (151).

In one embodiment, the account identification device (141) has fewer components than those illustrated in FIG. 6. For example, an account identification device (141) does not have the input device (153), the audio device (157) and the display device (155) in one embodiment; and in another embodiment, an account identification device (141) does not have components (151-159).

For example, in one embodiment, an account identification device (141) is in the form of a debit card, a credit card, a smartcard, or a consumer device that has optional features such as magnetic strips, or smartcards.

An example of an account identification device (141) is a magnetic strip attached to a plastic substrate in the form of a card. The magnetic strip is used as the memory (167) of the account identification device (141) to provide the account information (142). Consumer information, such as account number, expiration date, and consumer name may be printed or embossed on the card. A semiconductor chip implementing the memory (167) and the communication device (159) may also be embedded in the plastic card to provide account information (142) in one embodiment. In one embodiment, the account identification device (141) has the semiconductor chip but not the magnetic strip.

In one embodiment, the account identification device (141) is integrated with a security device, such as an access card, a radio frequency identification (RFID) tag, a security card, a transponder, etc.

In one embodiment, the account identification device (141) is a handheld and compact device. In one embodiment, the account identification device (141) has a size suitable to be placed in a wallet or pocket of the consumer.

Some examples of an account identification device (141) include a credit card, a debit card, a stored value device, a payment card, a gift card, a smartcard, a smart media card, a payroll card, a health care card, a wrist band, a keychain device, a supermarket discount card, a transponder, and a machine readable medium containing account information (142).

Point of Interaction

In one embodiment, the point of interaction (107) is to provide an advertisement to the user (101), or to provide information derived from the transaction data (109) to the user (101).

In one embodiment, an advertisement is a marketing interaction which may include an announcement and/or an offer of a benefit, such as a discount, incentive, reward, coupon, gift, cash back, or opportunity (e.g., special ticket/admission). An advertisement may include an offer of a product or service, an announcement of a product or service, or a presentation of a brand of products or services, or a notice of events, facts, opinions, etc. The advertisements can be presented in text, graphics, audio, video, or animation, and as printed matter, web content, interactive media, etc. An advertisement may be presented in response to the presence of a financial transaction card, or in response to a financial transaction card being used to make a financial transaction, or in response to other user activities, such as browsing a web page, submitting a search request, communicating online, entering a wireless communication zone, etc. In one embodiment, the presentation of advertisements may be not a result of a user action.

In one embodiment, the point of interaction (107) can be one of various endpoints of the transaction network, such as point of sale (POS) terminals, automated teller machines (ATMs), electronic kiosks (or computer kiosks or interactive kiosks), self-assist checkout terminals, vending machines, gas pumps, websites of banks (e.g., issuer banks or acquirer banks of credit cards), bank statements (e.g., credit card statements), websites of the transaction handler (103), websites of merchants, checkout websites or web pages for online purchases, etc.

In one embodiment, the point of interaction (107) may be the same as the transaction terminal (105), such as a point of sale (POS) terminal, an automated teller machine (ATM), a mobile phone, a computer of the user for an online transaction, etc. In one embodiment, the point of interaction (107) may be co-located with, or near, the transaction terminal (105) (e.g., a video monitor or display, a digital sign), or produced by the transaction terminal (e.g., a receipt produced by the transaction terminal (105)). In one embodiment, the point of interaction (107) may be separate from and not co-located with the transaction terminal (105), such as a mobile phone, a personal digital assistant, a personal computer of the user, a voice mail box of the user, an email inbox of the user, a digital sign, etc.

For example, the advertisements can be presented on a portion of media for a transaction with the customer, which portion might otherwise be unused and thus referred to as a "white space" herein. A white space can be on a printed matter (e.g., a receipt printed for the transaction, or a printed credit card statement), on a video display (e.g., a display monitor of a POS terminal for a retail transaction, an ATM for cash withdrawal or money transfer, a personal computer of the customer for online purchases), or on an audio channel (e.g., an interactive voice response (IVR) system for a transaction over a telephonic device).

In one embodiment, the white space is part of a media channel available to present a message from the transaction handler (103) in connection with the processing of a transaction of the user (101). In one embodiment, the white space is in a media channel that is used to report information about a transaction of the user (101), such as an authorization status, a confirmation message, a verification message, a user interface to verify a password for the online use of the account information (142), a monthly statement, an alert or a report, or a web page provided by the portal (143) to access a loyalty program associated with the consumer account (146) or a registration program.

In other embodiments, the advertisements can also be presented via other media channels which may not involve a transaction processed by the transaction handler (103). For example, the advertisements can be presented on publications or announcements (e.g., newspapers, magazines, books, directories, radio broadcasts, television, digital signage, etc., which may be in an electronic form, or in a printed or painted form). The advertisements may be presented on paper, on websites, on billboards, on digital signs, or on audio portals.

In one embodiment, the transaction handler (103) purchases the rights to use the media channels from the owner or operators of the media channels and uses the media channels as advertisement spaces. For example, white spaces at a point of interaction (e.g., 107) with customers for transactions processed by the transaction handler (103) can be used to deliver advertisements relevant to the customers conducting the transactions; and the advertisement can be selected based at least in part on the intelligence information derived from the accumulated transaction data (109) and/or the context at the point of interaction (107) and/or the transaction terminal (105).

In general, a point of interaction (e.g., 107) may or may not be capable of receiving inputs from the customers, and may or may not co-located with a transaction terminal (e.g., 105) that initiates the transactions. The white spaces for presenting the advertisement on the point of interaction (107) may be on a portion of a geographical display space (e.g., on a screen), or on a temporal space (e.g., in an audio stream).

In one embodiment, the point of interaction (107) may be used to primarily to access services not provided by the transaction handler (103), such as services provided by a search engine, a social networking website, an online marketplace, a blog, a news site, a television program provider, a radio station, a satellite, a publisher, etc.

In one embodiment, a consumer device is used as the point of interaction (107), which may be a non-portable consumer device or a portable computing device. The consumer device is to provide media content to the user (101) and may receive input from the user (101).

Examples of non-portable consumer devices include a computer terminal, a television set, a personal computer, a set-top box, or the like. Examples of portable consumer devices include a portable computer, a cellular phone, a personal digital assistant (PDA), a pager, a security card, a wireless terminal, or the like. The consumer device may be implemented as a data processing system as illustrated in FIG. 7, with more or fewer components.

In one embodiment, the consumer device includes an account identification device (141). For example, a smart card used as an account identification device (141) is integrated with a mobile phone, or a personal digital assistant (PDA).

In one embodiment, the point of interaction (107) is integrated with a transaction terminal (105). For example, a self-service checkout terminal includes a touch pad to interact with the user (101); and an ATM machine includes a user interface subsystem to interact with the user (101).

Hardware

In one embodiment, a computing apparatus is configured to include some of the modules or components illustrated in FIGS. 1 and 4, such as the transaction handler (103), the profile generator (121), the media controller (115), the portal (143), the profile selector (129), the advertisement selector (133), the user tracker (113), the correlator, and their associated storage devices, such as the data warehouse (149).

In one embodiment, at least some of the modules or components illustrated in FIGS. 1 and 4, such as the transaction handler (103), the transaction terminal (105), the point of interaction (107), the user tracker (113), the media controller (115), the correlator (117), the profile generator (121), the profile selector (129), the advertisement selector (133), the portal (143), the issuer processor (145), the acquirer processor (147), and the account identification device (141), can be implemented as a computer system, such as a data processing system illustrated in FIG. 7, with more or fewer components. Some of the modules may share hardware or be combined on a computer system. In one embodiment, a network of computers can be used to implement one or more of the modules.

Further, the data illustrated in FIG. 1, such as transaction data (109), account data (111), transaction profiles (127), and advertisement data (135), can be stored in storage devices of one or more computers accessible to the corresponding modules illustrated in FIG. 1. For example, the transaction data (109) can be stored in the data warehouse (149) that can be implemented as a data processing system illustrated in FIG. 7, with more or fewer components.

In one embodiment, the transaction handler (103) is a payment processing system, or a payment card processor, such as a card processor for credit cards, debit cards, etc.

FIG. 7 illustrates a data processing system according to one embodiment. While FIG. 7 illustrates various components of a computer system, it is not intended to represent any particular architecture or manner of interconnecting the components. One embodiment may use other systems that have fewer or more components than those shown in FIG. 7.

In FIG. 7, the data processing system (170) includes an inter-connect (171) (e.g., bus and system core logic), which interconnects a microprocessor(s) (173) and memory (167). The microprocessor (173) is coupled to cache memory (179) in the example of FIG. 7.

In one embodiment, the inter-connect (171) interconnects the microprocessor(s) (173) and the memory (167) together and also interconnects them to input/output (I/O) device(s) (175) via I/O controller(s) (177). I/O devices (175) may include a display device and/or peripheral devices, such as mice, keyboards, modems, network interfaces, printers, scanners, video cameras and other devices known in the art. In one embodiment, when the data processing system is a server system, some of the I/O devices (175), such as printers, scanners, mice, and/or keyboards, are optional.

In one embodiment, the inter-connect (171) includes one or more buses connected to one another through various bridges, controllers and/or adapters. In one embodiment the I/O controllers (177) include a USB (Universal Serial Bus) adapter for controlling USB peripherals, and/or an IEEE-1394 bus adapter for controlling IEEE-1394 peripherals.

In one embodiment, the memory (167) includes one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Other Aspects

The description and drawings are illustrative and are not to be construed as limiting. The present disclosure is illustrative of inventive features to enable a person skilled in the art to make and use the techniques. Various features, as described herein, should be used in compliance with all current and future rules, laws and regulations related to privacy, security, permission, consent, authorization, and others. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

The use of headings herein is merely provided for ease of reference, and shall not be interpreted in any way to limit this disclosure or the following claims.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, and are not necessarily all referring to separate or alternative embodiments mutually exclusive of other embodiments. Moreover, various features are described which may be exhibited by one embodiment and not by others. Similarly, various requirements are described which may be requirements for one embodiment but not other embodiments. Unless excluded by explicit description and/or apparent incompatibility, any combination of various features described in this description is also included here. For example, the features described above in connection with "in one embodiment" or "in some embodiments" can be all optionally included in one implementation, except where the dependency of certain features on other features, as apparent from the description, may limit the options of excluding selected features from the implementation, and incompatibility of certain features with other features, as apparent from the description, may limit the options of including selected features together in the implementation.

The disclosures of the above discussed patent documents are hereby incorporated herein by reference.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method, comprising:
communicating, by a computing device, with a user device to receive information about a user of the user device;
forming, by the computing device, a dataset including
the information about the user received from the user device, and
a first identifier of the user used by the computing device to identify the user from a plurality of users of the computing device;
generating, by the computing device, a digital signature on the dataset;
generating, by the computing device, a second identifier of the user using the digital signature, wherein the second identifier is not part of the dataset; and
providing, by the computing device, an instruction to the user device to redirect the user to a server separate from the computing device, the instruction configured to instruct the user device to use the second identifier to identify the user in submitting the information about the user to the server;
wherein the server is configured to validate the information about the user submitted from the user device with the second identifier via
extracting the first identifier and the digital signature from the second identifier;
combining the first identifier extracted from the second identifier with the information about the user submitted from the user device to the server to form a reconstructed dataset;
validating the reconstructed dataset against the digital signature extracted from the second identifier.

2. The method of claim 1, wherein the generating of the second identifier of the user includes combining the first user identifier and the digital signature to allow the first user identifier and the digital signature to be extracted from the second identifier.

3. The method of claim 2, further comprising:
assigning, by the computing device, the first identifier to uniquely identify the user among the plurality of users of the computing device.

4. The method of claim 2, wherein the dataset includes a secret shared between the computing device and the server separate from the computing device.

5. The method of claim 4, wherein the secret is not communicated between the computing device and the server through the user device.

6. The method of claim 5, wherein the digital signature comprises a hash of the dataset.

7. The method of claim 2, wherein the generating of the second identifier of the user includes generating the second identifier of the user using a secret not communicated through the user device, the secret shared between the computing device and the server.

8. The method of claim 1, wherein the dataset further includes:
a secret shared between the computing device and the server.

9. The method of claim 8, wherein the secret represents the computing device in the digital signature provided in the identifier of the user.

10. The method of claim 1, wherein the validating the reconstructed data set against the digital signature extracted from the second identifier of the user includes:
generating a reconstructed digital signature on the reconstructed dataset; and
determining whether the reconstructed digital signature agrees with the digital signature extracted from the second identifier of the user received in the server.

11. The method of claim 1, wherein the digital signature is generated via applying a cryptographic one-way hash function on the dataset.

12. The method of claim 11, wherein the cryptographic one-way hash function is based on SHA-256 designed by the National Security Agency (NSA) and published in 2001 by the National Institute of Standards and Technology (NIST) as a U.S. Federal Information Processing Standard.

13. The method of claim 1, wherein the information about the user includes an identification of the user device extracted from a request received from the user device.

14. A non-transitory computer storage medium storing instructions configured to instruct a computing device to at least:
  authenticate, by the computing device, a user of a user device;
  form, by the computing device, a dataset including
    information about the user received from the user device, and
    a first identifier of the user used by the computing device to identify the user from a plurality of users of the computing device;
  generate, by the computing device, a digital signature on the dataset;
  generate, by the computing device, a second identifier of the user using the digital signature, wherein the second identifier is not part of the dataset; and
  provide, by the computing device, an instruction to the user device to redirect the user to a server separate from the computing device, the instruction configured to instruct the user device to use the second identifier to identify the user in submitting the information about the user to the server;
  wherein the server is configured to validate the information about the user submitted from the user device with the second identifier via
    extracting the first identifier and the digital signature from the second identifier;
    combining the first identifier extracted from the second identifier with the information about the user submitted from the user device to the server to form a reconstructed dataset;
    validating the reconstructed dataset against the digital signature extracted from the second identifier.

15. The computer storage medium of claim 14, wherein the instruction comprises a query string for the server, the query string including the second identifier of the user and the information about the user.

16. A computing device, comprising:
  at least one microprocessor; and
  a memory storing instructions configured to instruct the at least one microprocessor to:
    authenticate, by the computing device, a user of a user device;
    communicate, by the computing device, with the user device to receive information about the user after authentication of the user of the user device;
    form, by the computing device, a dataset including
      the information about the user received from the user device, and
      a first identifier of the user used by the computing device to identify the user from a plurality of users of the computing device;
    generate, by the computing device, a digital signature on the dataset;
    generate, by the computing device, a second identifier of the user using the digital signature, wherein the second identifier is not part of the dataset; and
    provide, by the computing device, an instruction to the user device to redirect the user to a server separate from the computing device, the instruction configured to instruct the user device to use the second identifier to identify the user in submitting the information about the user to the server;
  wherein the server is configured to validate the information about the user submitted from the user device with the second identifier via
    extracting the first identifier and the digital signature from the second identifier;
    combining the first identifier extracted from the second identifier with the information about the user submitted from the user device to the server to form a reconstructed dataset;
    validating the reconstructed dataset against the digital signature extracted from the second identifier.

17. The computing device of claim 16, wherein the dataset further includes:
  a secret shared between the computing device and the server to represent the computing device.

18. The computing device of claim 17, wherein the digital signature is generated by applying a cryptographic one-way hash function on the dataset to obtain a hash value; and the first user identifier and the hash value are extractable from the second identifier of the user.

19. The method of claim 1, further comprising:
  authenticating, by the computing device, the user of the user device, wherein the information about the user is received in the computing device after the user of the user device is authenticated by the computing device.

* * * * *